(12) United States Patent
Kuriyama et al.

(10) Patent No.: US 10,003,073 B2
(45) Date of Patent: Jun. 19, 2018

(54) ELECTRODE AND NONAQUEOUS ELECTROLYTE BATTERY

(71) Applicant: KABUSHIKI KAISHA TOSHIBA, Minato-ku (JP)

(72) Inventors: Hiromichi Kuriyama, Yokkaichi (JP); Hidesato Saruwatari, Kawasaki (JP); Hideki Satake, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 59 days.

(21) Appl. No.: 15/196,732

(22) Filed: Jun. 29, 2016

(65) Prior Publication Data

US 2016/0308202 A1    Oct. 20, 2016

Related U.S. Application Data

(63) Continuation of application No. PCT/JP2014/084519, filed on Dec. 26, 2014.

(30) Foreign Application Priority Data

Jan. 6, 2014   (JP) .................................. 2014-000596

(51) Int. Cl.
    *H01M 4/36*       (2006.01)
    *H01M 4/525*      (2010.01)
    (Continued)

(52) U.S. Cl.
    CPC ........... *H01M 4/366* (2013.01); *H01M 4/131* (2013.01); *H01M 4/485* (2013.01); *H01M 4/505* (2013.01);
    (Continued)

(58) Field of Classification Search
    CPC ....... H01M 10/0525; H01M 2004/028; H01M 4/131; H01M 4/366; H01M 4/485;
    (Continued)

(56) References Cited

U.S. PATENT DOCUMENTS

2009/0050859 A1    2/2009  Liu et al.
2009/0075172 A1    3/2009  Ando et al.
            (Continued)

FOREIGN PATENT DOCUMENTS

JP      2006-12426      1/2006
JP      2006-12433      1/2006
            (Continued)

OTHER PUBLICATIONS

Extended European Search Report dated Jul. 5, 2017 in European Patent Application No. 14875951.7.

(Continued)

*Primary Examiner* — Carlos Barcena
(74) *Attorney, Agent, or Firm* — Oblon, McClelland, Maier & Neustadt, L.L.P.

(57) ABSTRACT

According to one embodiment, an electrode is provided. The electrode includes an electrode mixture layer and a current collector. The electrode mixture layer contains active material particles. The electrode mixture layer includes a first surface being in contact with the current collector and a second surface separated from the first surface by a thickness of the electrode mixture layer. The electrode mixture layer includes a first portion having the first surface and a second portion having the second surface. In the first portion, a first oxide layer is formed on the active material particle. In the second portion, a second oxide layer is formed on the active material particles. The thickness of the first oxide layer is more than the thickness of the second oxide layer.

11 Claims, 4 Drawing Sheets

(51) Int. Cl.
  *H01M 4/485* (2010.01)
  *H01M 4/131* (2010.01)
  *H01M 4/505* (2010.01)
  *H01M 4/58* (2010.01)
  *H01M 10/0525* (2010.01)
  *H01M 4/62* (2006.01)
  *H01M 4/02* (2006.01)

(52) U.S. Cl.
  CPC ......... *H01M 4/525* (2013.01); *H01M 4/5825* (2013.01); *H01M 10/0525* (2013.01); *H01M 4/62* (2013.01); *H01M 2004/028* (2013.01)

(58) Field of Classification Search
  CPC .... H01M 4/505; H01M 4/525; H01M 4/5825; H01M 4/62
  See application file for complete search history.

(56) References Cited

U.S. PATENT DOCUMENTS

| | | |
|---|---|---|
| 2009/0200509 A1 | 8/2009 | Suzuki et al. |
| 2009/0220862 A1 | 9/2009 | Toyama et al. |
| 2009/0239148 A1 | 9/2009 | Jiang |
| 2012/0034503 A1 | 2/2012 | Toyama et al. |
| 2013/0209865 A1 | 8/2013 | Kim et al. |
| 2013/0216897 A1 | 8/2013 | Kim et al. |
| 2013/0344388 A1 | 12/2013 | Simonin et al. |

FOREIGN PATENT DOCUMENTS

| | | |
|---|---|---|
| JP | 2008-16244 | 1/2008 |
| JP | 2009-200007 | 9/2009 |
| JP | 2009-206047 | 9/2009 |
| JP | 2009-218198 | 9/2009 |
| JP | 2013-84499 | 5/2013 |
| JP | 2013-543221 | 11/2013 |
| WO | WO 02/061864 A1 | 8/2002 |
| WO | WO 2012/121220 A1 | 9/2012 |

OTHER PUBLICATIONS

International Search Report dated Feb. 10, 2015 in application PCT/JP2014/084519 filed on Dec. 26, 2014(with English Translation).

Written Opinion dated Feb. 10, 2015 in application PCT/JP2014/084519 filed on Dec. 26, 2014.

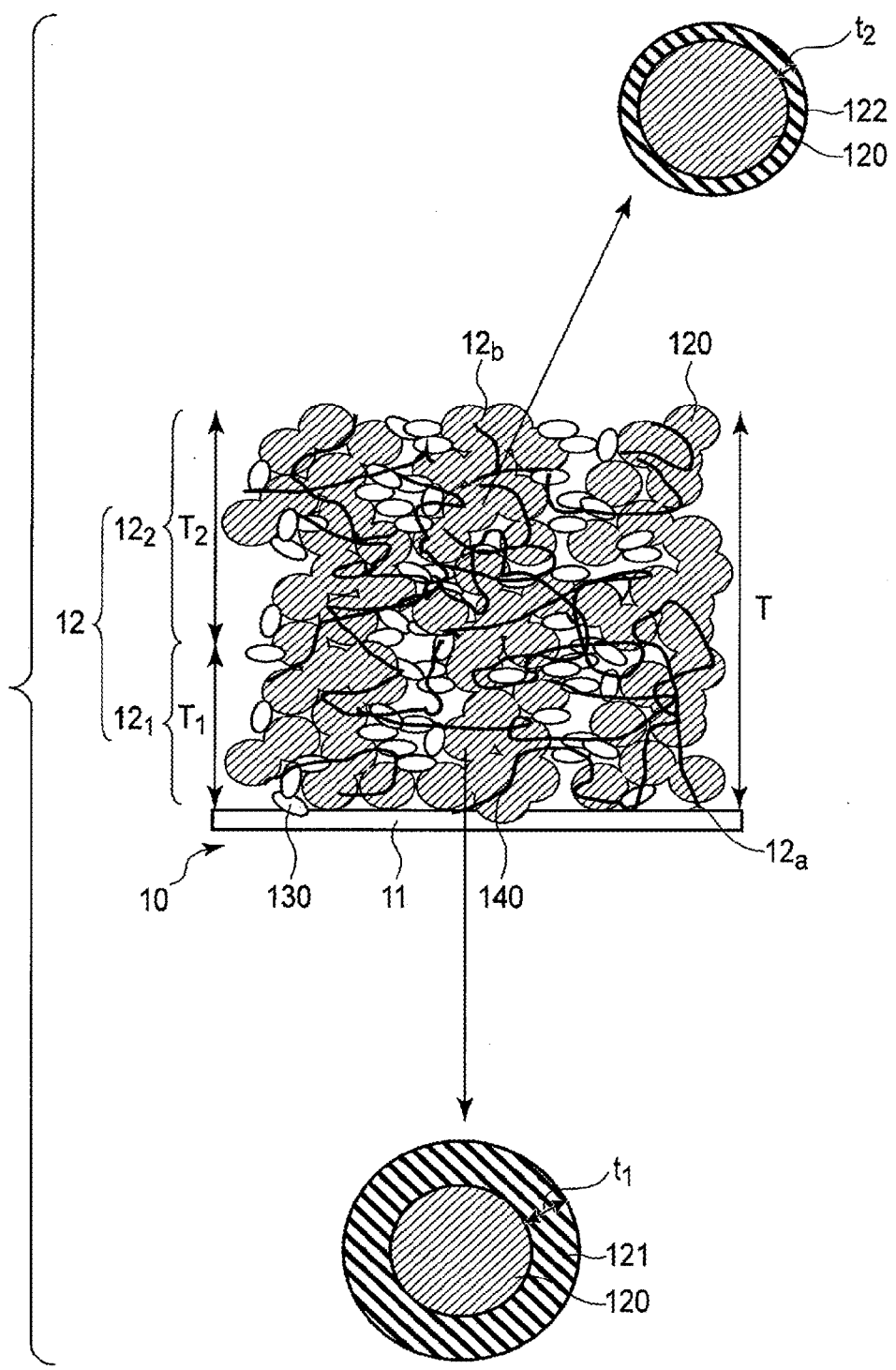
F I G. 1

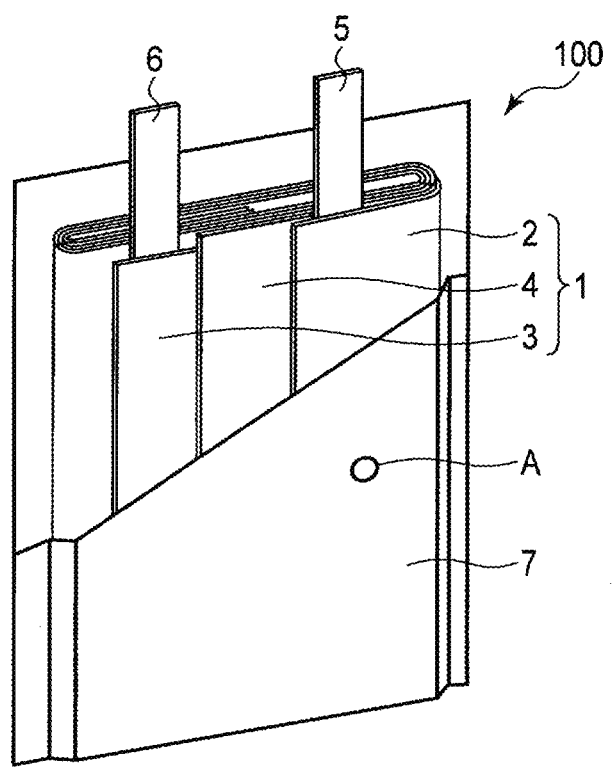
F I G. 2

ELECTRODE AND NONAQUEOUS ELECTROLYTE BATTERY

CROSS-REFERENCE TO RELATED APPLICATIONS

This application is a Continuation Application of PCT Application No. PCT/JP2014/084519, filed Dec. 26, 2014 and based upon and claiming the benefit of priority from the Japanese Patent Application No. 2014-000596, filed Jan. 6, 2014, the entire contents of all of which are incorporated herein by reference.

FIELD

Embodiments of the present invention relate to an electrode and a nonaqueous electrolyte battery.

BACKGROUND

It is an important problem to increase the energy density of a positive electrode when a lithium-ion secondary battery having a high energy density is developed. It is possible to increase the density of a positive electrode mixture which mainly contains a positive electrode active material, a conductive agent, and a binder, to increase the energy density of the positive electrode.

On the other hand, an excellent capacity retention is also required for the lithium-ion secondary battery. In order to achieve the excellent capacity retention, for example, the preventing the deterioration in an electrode is considered.

BRIEF DESCRIPTION OF DRAWINGS

FIG. 1 shows a schematic sectional view of an electrode as an example according to a first embodiment, and schematic sectional views of active material particles respectively contained in a first portion and second portion of an electrode mixture layer of the electrode.

FIG. 2 is a partially cutout perspective view of a nonaqueous electrolyte battery as an example according to a second embodiment.

DETAILED DESCRIPTION

Figure 3:
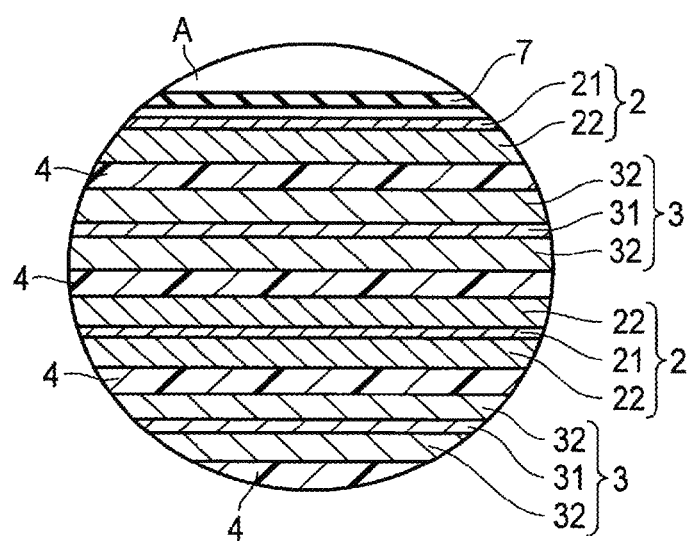
FIG. 3 is an enlarged sectional view of a part A of the nonaqueous electrolyte battery shown in FIG. 2.

In general, according to an embodiment, an electrode is provided. This electrode includes an electrode mixture layer and a current collector having at least one surface on which the electrode mixture layer is supported. The electrode mixture layer contains active material particles containing Li and at least one transition metal selected from the group consisting of Fe, Mn, Co and Ni. The electrode mixture layer includes a first surface being in contact with the current collector and a second surface separated by a thickness of the electrode mixture layer from the first surface. The electrode mixture layer includes a first portion having the first surface and a second portion having the second surface. The first portion has a thickness of at least 20% of the thickness of the electrode mixture layer. The second portion has a thickness of at least 20% of the thickness of the electrode mixture layer. In the first portion of the electrode mixture layer, a first oxide layer is formed on surfaces of the active material particles. The first oxide layer contains at least one element selected from the group consisting of Li, Mg, Ca, B, Al, Si, P, Fe, Mn, Co, Ni, Cu, Zn, Zr, Nb, Mo, Ta and W. The first oxide layer has a thickness of more than 0.5 nm and 100 nm or less. In the second portion of the electrode mixture layer, a second oxide layer is formed on surfaces of the active material particles. The second oxide layer contains at least one element selected from the group consisting of Li, Mg, Ca, B, Al, Si, P, Fe, Mn, Co, Ni, Cu, Zn, Zr, Nb, Mo, Ta and W. The second oxide layer has a thickness of 0.5 nm or more and less than 100 nm. The thickness of the first oxide layer is more than the thickness of the second oxide layer.

Hereinafter, the embodiments will be described with reference to the drawings. The same reference numerals denote common portions throughout the embodiments and overlapping descriptions are not repeated. Each of these drawings is a typical view to aid the descriptions and promote an understanding of the embodiment. Although there are parts different from those of actual devices in shape, dimension and ratio, these structural designs may be properly changed taking the following descriptions and known technologies into consideration.

First Embodiment

According to a first embodiment, an electrode is provided. This electrode includes an electrode mixture layer and a current collector having at least one surface on which the electrode mixture layer is supported. The electrode mixture layer contains active material particles containing Li and at least one transition metal selected from the group consisting of Fe, Mn, Co and Ni. The electrode mixture layer includes a first surface being in contact with the current collector and a second surface separated by a thickness of the electrode mixture layer from the first surface. The electrode mixture layer includes a first portion having the first surface and a second portion having the second surface. The first portion has a thickness of at least 20% of the thickness of the electrode mixture layer. The second portion has a thickness of at least 20% of the thickness of the electrode mixture layer. In the first portion of the electrode mixture layer, a first oxide layer is formed on surfaces of the active material particles. The first oxide layer contains at least one element selected from the group consisting of Li, Mg, Ca, B, Al, Si, P, Fe, Mn, Co, Ni, Cu, Zn, Zr, Nb, Mo, Ta and W. The first oxide layer has a thickness of more than 0.5 nm and 100 nm or less. In the second portion of the electrode mixture layer, a second oxide layer is formed on surfaces of the active material particles. The second oxide layer contains at least one element selected from the group consisting of Li, Mg, Ca, B, Al, Si, P, Fe, Mn, Co, Ni, Cu, Zn, Zr, Nb, Mo, Ta and W. The second oxide layer has a thickness of 0.5 nm or more and less than 100 nm. The thickness of the first oxide layer is more than the thickness of the second oxide layer.

The present inventors found that if an electrode produced by increasing the density of an electrode mixture layer without considering capacity retention is used, it is difficult to achieve a nonaqueous electrolyte battery which can exhibits an excellent capacity retention.

As a result of intensive research, the inventors found that this is because if an electrode mixture layer having a high density is used in a nonaqueous electrolyte battery, deviation of deterioration in an active material occurs in the electrode mixture layer during repeated charge-and-discharge cycles, as described in detail later.

First, as the density of the electrode mixture layer is increased, voids in the electrode mixture layer are decreased. The decrease in the voids causes a deterioration in the permeability of a nonaqueous electrolyte in the electrode mixture layer. As a result, the nonaqueous electrolyte is difficult to arrive at a portion near a current collector in the electrode mixture layer as compared with a portion away from the current collector. Therefore, in an electrode mixture layer with few voids, a deviation of diffusibility of ions participating in charge and discharge, for example, lithium ions would occur.

In the electrode mixture layer having the deviation of diffusibility of lithium ions as described above, the excess or deficiency of the amount of Li participating in a Li insertion and extraction reactions in an active material are apt to be caused in the portion near the current collector. That is, the lithium ions which are present in the reaction interface between the active material and the nonaqueous electrolyte are apt to be insufficient in the portion near the current collector in the electrode mixture layer during the Li insertion reaction. On the other hand, during the Li extraction reaction, the lithium ions which are present in the reaction interface between the active material and the nonaqueous electrolyte are apt to be in excess in such a portion.

On the other hand, as one cause of the deterioration in the active material, a Li insertion and extraction reaction in a state where excess and deficiency are caused in the amount of the lithium ions is included. A Li concentration becomes rate-limiting in both the Li insertion reaction and the Li extraction reaction. Therefore, when the Li insertion reaction or the Li extraction reaction is caused in a state where the excess or deficiency of the lithium ions are caused in the reaction interface between the active material and the nonaqueous electrolyte, the crystal structure of the active material metamorphoses, and the active material is deteriorated. For example, when the Li insertion reaction is caused in a state where the lithium ions are insufficient, an excess voltage is applied to the active material, which makes the deterioration in the active material proceed.

In the portion near the current collector in the electrode mixture layer, excess and deficiency in the amount of the lithium ions are apt to be caused, as described above, which is apt to cause the deterioration in the portion. An electrode containing an electrode mixture in which the deterioration in an active material is deviated may cause a decrease in a capacity and an increase in resistance. This is the reason why the use of an electrode in which the deterioration in the active material may deviate makes it difficult to achieve a nonaqueous electrolyte battery capable of exhibiting an excellent capacity retention.

In the electrode according to the first embodiment, the first oxide layer is formed on the surfaces of the active material particles contained in the first portion in the electrode mixture layer, i.e., the portion near the current collector. The first oxide layer can relax the excess voltage applied to the surfaces of the active material particles to prevent a deterioration in the structure of the active material.

On the other hand, the second oxide layer is formed on the surfaces of the active material particles contained in the second portion in the electrode mixture layer, i.e., the portion away from the current collector. Herein, the thickness of the second oxide layer is smaller than the thickness of the first oxide layer. Although the second oxide layer has such a thickness smaller than that of the first oxide layer, the excess and deficiency of the lithium ions are less likely to be caused in the portion away from the current collector as compared with the portion near the current collector, as described above. Therefore, the second oxide layer having a thickness smaller than that of the first oxide layer can also sufficiently prevent the deterioration in the structures of the active material particles contained in the second portion of the electrode mixture layer. Since the second oxide layer does not participate in charge and discharge reactions, the second oxide layer having a small thickness can prevent the decrease in the capacity of the electrode.

That is, the electrode according to the first embodiment can suppress the shift of advance of the deterioration in the active material between the first portion and the second portion in the electrode mixture layer, and thereby the deviation of the deterioration in the active material in the electrode mixture layer can be eliminated. The electrode according to the first embodiment can eliminate the deviation of the deterioration while preventing the decrease in the capacity of the electrode. Because of this, the electrode according to the first embodiment can achieve a nonaqueous electrolyte battery capable of exhibiting a high energy density and an excellent capacity retention.

Next, the electrode according to the first embodiment will be described in more detail.

The active material particles contained in the electrode mixture layer contain a composite oxide containing lithium (Li) and at least one transition metal selected from the group consisting of iron (Fe), manganese (Mn), cobalt (Co), and nickel (Ni). Examples of the composite oxide include a lithium-manganese composite oxide (e.g., $LiMn_2O_4$ or $LiMnO_2$), a lithium-nickel composite oxide (e.g., $LiNiO_2$), a lithium-cobalt composite oxide ($LiCoO_2$), a lithium-nickel-cobalt composite oxide (e.g., $LiNi_{1-x}Co_xO_2$, $0<x\leq1$), a lithium-manganese-cobalt composite oxide (e.g., $LiMn_xCo_{1-x}O_2$, $0<x\leq1$), lithium-iron phosphate ($LiFePO_4$), and a lithium composite phosphate compound (e.g., $LiMn_xFe1_{-x}PO_4$, $0<x\leq1$). The each composite oxide can provide an excellent energy density.

The active material particles may be primary particles, or may be secondary particles obtained by granulating the primary particles.

The electrode mixture layer can also contain active materials other than the active material particles.

The electrode mixture layer can further contain a conductive agent and a binder. The conductive agent can be blended, as necessary, to improve the current collection performance and suppress the contact resistance between the active material and current collector. Examples of the conductive agent include acetylene black, carbon black, and graphite. The binder can bind the active material and the current collector. Examples of the binder include polytetrafluoroethylene (PTFE), polyvinylidene fluoride (PVdF), fluorine-based rubber, styrene-butadiene rubber (SBR), polypropylene (PP), polyethylene (PE), and carboxymethyl cellulose (CMC). The content of each material in the electrode mixture layer will be described later.

The electrode mixture layer can have a thickness of 20 μm to 200 μm, for example. The thickness of the electrode mixture layer is preferably 20 μm to 100 μm.

The first portion having the first surface being in contact with the current collector in the electrode mixture layer has a thickness of at least 20% of the thickness of the electrode mixture layer. When the thickness of the first portion is less than 20% of the thickness of the electrode mixture layer, the deviation of the deterioration in the active material in the electrode mixture layer cannot be sufficiently eliminated. Preferably, the first portion has a thickness of 50% or less of the thickness of the electrode mixture layer. When the thickness of the first portion is within this range, the decrease in the capacity of the electrode can be further suppressed while the deviation of the deterioration in the active material in the electrode mixture layer can be sufficiently eliminated.

The second portion having the second surface in the electrode mixture layer has a thickness of at least 20% of the thickness of the electrode mixture layer. When the thickness of the second portion is less than 20% of the thickness of the electrode mixture layer, the decrease in the capacity of the electrode cannot be sufficiently suppressed. Preferably, the second portion has a thickness of 50% or less of the thickness of the electrode mixture layer. When the thickness of the second portion is within this range, the decrease in the capacity of the electrode can be further suppressed while the deviation of the deterioration in the active material in the electrode mixture layer can be sufficiently eliminated.

In the first portion of the electrode mixture layer, a first oxide layer is formed on surfaces of the active material particles. The first oxide layer contains at least one element selected from the group consisting of lithium (Li), magnesium (Mg), calcium (Ca), boron (B), aluminum (Al), silicon (Si), phosphorus (P), iron (Fe), manganese (Mn), cobalt (Co), nickel (Ni), copper (Cu), zinc (Zn), zirconium (Zr), niobium (Nb), molybdenum (Mo), tantalum (Ta), and tungsten (W).

The thickness of the first oxide layer is more than 0.5 nm and 100 nm or less. When the thickness of the first oxide layer is 0.5 nm or less, the deterioration in the active material particles cannot be sufficiently suppressed in the first portion of the electrode mixture layer, and as a result, the decrease in a capacity and the increase in resistance during charge-and-discharge cycles cannot be sufficiently suppressed. When the thickness of the first oxide layer is more than 100 nm, the resistance of the first oxide layer is increased, which causes a decrease in input and output characteristics.

In the second portion of the electrode mixture layer, a second oxide layer is formed on surfaces of the active material particles. The second oxide layer contains at least one element selected from the group consisting of Li, Mg, Ca, B, Al, Si, P, Fe, Mn, Co, Ni, Cu, Zn, Zr, Nb, Mo, Ta, and W.

The thickness of the second oxide layer is 0.5 nm or more and less than 100 nm. When the thickness of the second oxide layer is less than 0.5 nm, the deterioration in the active material particles in the second portion of the electrode mixture layer cannot be sufficiently suppressed, and as a result, the decrease in a capacity and the increase in resistance during charge-and-discharge cycles cannot be sufficiently suppressed. When the thickness of the second oxide layer is 100 nm or more, the resistance of the second oxide layer is increased, which causes the decrease in input and output characteristics.

Furthermore, as described above, the thickness of the first oxide layer is more than the thickness of the second oxide layer. When the thickness of the first oxide layer is equal to or less than the thickness of the second oxide layer, the shift of the advance of the deterioration in the active material between the first portion and the second portion in the electrode mixture layer cannot be suppressed. Preferably, the ratio of the thickness of the first oxide layer to the thickness of the second oxide layer is 5 or more. When the thickness ratio is 5 or more, the deviation of the deterioration in the electrode mixture layer can further be suppressed. More preferably, the ratio of the thickness of the first oxide layer to the thickness of the second oxide layer is 200 or less. When the thickness ratio is 200 or less, the difference in resistance between the first portion and the second portion can be suppressed, and the deviation of a charge-and-discharge contribution between the active material particles contained in the first portion and the active material particles of the second portion can be suppressed. As a result, the decrease in a capacity during cycles can be further suppressed. More preferably, the ratio of the thickness of the first oxide layer to the thickness of the second oxide layer is 5 or more and 50 or less.

The first oxide layer and the second oxide layer preferably cover reaction interfaces in which Li insertion and extraction reactions are caused. For example, in an active material having a layered rock salt structure represented by $LiNiO_2$ and $LiCoO_2$, the surface of the particle in a direction perpendicular to the axis C of crystal axes forms an interface for the Li insertion and extraction reactions. By covering the reaction interface with an oxide layer, the deterioration in the active material particles can be further suppressed. For example, the oxide layer covering the reaction interface can be formed by covering the whole surface of the active material particles with the oxide layer.

In the first embodiment, the electrode mixture layer is supported on at least one surface of the current collector. That is, an electrode mixture layer may be supported on only one surface of the current collector, or on each of both surfaces thereof. The current collector may include a portion on which an electrode mixture layer is not supported. The portion can be used as an electrode tab, for example.

A sheet containing a material having high electrical conductivity can be used as the current collector. For example, an aluminum foil or an aluminum alloy foil can be used as the current collector. When the aluminum foil or the aluminum alloy foil is used, the thickness is, for example, 20 μm or less, and preferably 15 μm or less. The aluminum alloy foil can contain magnesium, zinc, and silicon and the like. The content of transition metals such as iron, copper, nickel, and chromium contained in the aluminum alloy foil is preferably 1% or less.

Next, an example of a method for a producing the electrode according to the first embodiment will be described.

First, two or more different slurries including a first slurry for a first portion of an electrode mixture layer and a second slurry for a second portion of the electrode mixture layer are prepared.

The slurry can be prepared as follows, for example.

First, active material particles for the first portion and active material particles for the second portion are prepared.

Then, an oxide layer is formed on the surface of the prepared active material particles, to obtain an active material composite having the oxide layer formed on the surface of the active material particles.

The oxide layer can be formed on the surface of a portion of the active material particles by dry coating methods such as a CVD method and a sputtering method, wet coating methods such as a sol-gel method and electroless plating, and combined mixing/milling methods such as a ball mill method and a jet mill method.

Here is an example. When nickel monoxide (NiO) is formed on the surfaces of the active material particles $LiNi_{0.8}Co_{0.2}O_2$, the sol-gel method can be used. Specifically, first, active material particles made of $LiNi_{0.8}Co_{0.2}O_2$ are introduced into a methanol ($CH_3OH$) solution in which nickel acetate ($Ni(CH_3COO)_2 \cdot 4H_2O$) as a covering material is uniformly dissolved, followed by stirring. After stirring, the solution is dried to obtain the active material particles to which the covering material adheres. After drying, the active material particles to which the covering material adheres are fired at a temperature of 150° C. to 500° C. for several minutes to several hours. Thus, active-material composite in which an oxide layer of nickel oxide is formed on the surfaces of the active material particles of $LiNi_{0.8}Co_{0.2}O_2$ is obtained.

Herein, the thickness of the first oxide layer formed on the surfaces of the active material particles for the first portion is made more than the thickness of the second oxide layer formed on the surfaces of the active material particles for the second portion. The thickness of the oxide layer can be controlled by adjusting some of conditions for an oxide forming method in combination. For example, in the case of the previous example, the thickness of the oxide layer can be changed by adjusting the weight ratio of nickel acetate to the active material particles.

Other specific examples of the method for forming an oxide layer and the method for adjusting the thickness will be described in detail later.

Now, the active-material composite for the first portion obtained as described above is introduced together with a conductive agent and a binder into a suitable solvent, followed by stirring. Thus, the first slurry for the first portion is obtained. The slurry for the second portion can be prepared in the same manner as in the first slurry except that the active-material composite for the second portion is used in place of the active-material composite for the first portion.

It is preferable that the weight percentages of the active-material composite, conductive agent, and binder introduced into the solvent when the slurry is prepared are respectively set to 80 to 95% by weight, 3 to 15% by weight, and 2 to 5% by weight.

Subsequently, the first slurry prepared as described above is applied to the surface of the current collector. After application, the coated film is dried and pressed. Thus, the first portion of the electrode mixture layer is obtained.

Subsequently, the second slurry prepared as described above is applied to the surface of the first portion of the electrode mixture layer. After application, the coated film is dried and pressed. Thus, the second portion of the electrode mixture layer is obtained, and the electrode according to the first embodiment is obtained.

In the example of the production method described above, the second slurry is applied to the surface of the first portion of the electrode mixture layer. However, for example, a slurry different from the first slurry and the second slurry may be further applied to the surface of the first portion to form a further portion of the electrode mixture layer.

<Specific Example of Method for Forming Oxide Layer>

Hereinafter, some specific examples of a method for forming a first oxide layer and a second oxide layer on the surfaces of active material particles respectively and a method for controlling the thicknesses of these oxide layers will be described.

1. Example of Method for Forming Layer of NiO, CoO, MnO, MgO, CaO, $AlPO_4$, $Fe_3O_4$, CuO, ZnO, or $Li_4P_2O_7$ as Oxide Layer In order to form a layer of NiO, CoO, MnO, MgO, $AlPO_4$, $Fe_3O_4$, CuO, ZnO, or $Li_4P_2O_7$ on the surfaces of active material particles as the oxide layer, a sol-gel method can be used, for example.

An example of the method for forming the oxide layer according to the sol-gel method will be described later.

First, with reference to the following Table 1, a covering material corresponding to a target oxide layer to be formed on the surfaces of active material particles is selected. The selected covering material is introduced into distilled water, and the distilled water is stirred at room temperature for about 10 hours. Thus, a solution in which the covering material is dissolved is obtained.

Subsequently, positive electrode active material particles are introduced into the solution in which the covering material is dissolved, and the solution in which the covering raw material is dissolved is further stirred at room temperature for about 10 hours. Thus, a mixed solution is obtained.

Herein, the mixed weight ratio of covering material:active material particles:water in the mixed solution is set to x:100:300. That is, x is the additive weight (g) of the covering material based on 100 g of the active material particles. By changing the additive amount x, the thickness of the oxide layer to be finally obtained can be changed. In the following Table 1, the value of the additive amount $x_{10}$ of the covering material required for setting the thickness of the oxide layer to be finally obtained to 10 nm is shown as a representative value in the following Table 1. The additive amount $x_t$ of the covering material required for obtaining an oxide layer having a thickness t (nm) different from 10 nm can be obtained by substituting the target thickness t and the representative value $x_{10}$ in the following formula.

$$x_t = x_{10} \times t/10$$

TABLE 1

| Target Oxide Layer | Covering material | Additive Amount $x_{10}$ (g) of Covering Material required to form 10-nm-thick Oxide Layer (based on Active material particles: 100) |
|---|---|---|
| NiO | $Ni(CH_3COO)_2 \cdot 4H_2O$ | 11 |
| CoO | $Co(CH_3COO)_2 \cdot 4H_2O$ | 10 |
| MnO | $Mn(CH_3COO)_2 \cdot 4H_2O$ | 7 |
| MgO | $(CH_3COO)_2Mg \cdot 4H_2O$ | 10 |
| CaO | $(CH_3COO)_2Ca \cdot H_2O$ | 5 |
| $AlPO_4$ | $Al(NO_3)_3 \cdot 9H_2O$ | 4 |
|  | $(NH_4)_2HPO_4$ | 1 |
| $Fe_3O_4$ | $Fe(CH_3COO)_2 \cdot 4H_2O$ | 8 |
| CuO | $Cu(CH_3COO)_2$ anhydride | 7 |
| ZnO | $Zn(CH_3COO)_2 \cdot 2H_2O$ | 8 |
| $Li_4P_2O_7$ | $LiOH \cdot H_2O$ | 1 |
|  | $(NH_4)_2HPO_4$ | 2 |

The mixed solution thus obtained is dried at 120° C. for 5 hours, to obtain a powder. Subsequently, the obtained powder is fired at a temperature of 150° C. to 500° C. for several minutes to several hours, to obtain a powder of active material particles having surfaces on which a target oxide layer having a target thickness is formed.

2. Example of Method for Forming Layer of $ZrO_2$, $Nb_2O_5$, $MoO_3$, $Ta_2O_5$, $WO_3$, $SiO_2$, or $Al_2O_3$ as Oxide Layer In order to form a layer of $ZrO_2$, $Nb_2O_5$, $MoO_3$, $Ta_2O_5$, $WO_3$, $SiO_2$, or $Al_2O_3$ on the surfaces of active material particles as the oxide layer, a sol-gel method can be used, for example.

An example of the method for forming the oxide layer according to the sol-gel method will be described later.

First, with reference to the following Table 2, a covering material and solvent corresponding to a target oxide layer to be formed on the surfaces of active material particles are selected. The selected covering material is introduced into the selected solvent, and the solvent is stirred at room temperature for about 10 hours. Thus, a solution in which the covering material is dissolved is obtained.

Subsequently, positive electrode active material particles are introduced into the solution in which the covering material is dissolved, and the solution in which the covering material is dissolved is further stirred at room temperature for about 10 hours. Thus, a mixed solution is obtained.

Herein, the mixed weight ratio of covering material:active material particles:solvent in the mixed solution is set to y:100:300. y is the additive weight (g) of the covering material based on 100 g of the active material particles. By changing the additive amount y, the thickness of the oxide layer to be finally obtained can be changed. In the following Table 2, the value of the additive amount $y_{10}$ of the covering material required for setting the thickness of the oxide layer to be finally obtained to 10 nm is shown as a representative value in the following Table 2. The additive amount $y_t$ of the covering material required for obtaining an oxide layer having a thickness t (nm) different from 10 nm can be obtained by substituting the target thickness t and the representative value $y_{10}$ in the following formula.

$$y_t = y_{10} \times t/10$$

TABLE 2

| Target Oxide layer | Covering material | Solvent | Additive Amount $y_{10}$ (g) of Covering Material required to form 10-nm-thick Oxide Layer (based on Active material particles: 100) |
|---|---|---|---|
| $ZrO_2$ | $Zr(OC_3H_7)_4$ | Propanol | 8 |
| $Nb_2O_5$ | $(CH_3CH_2O)_5Nb$ | Ethanol | 5 |
| $MoO_3$ | $Mo(OC_3H_7)_5$ | Butanol | 6 |
| $Ta_2O_5$ | $(CH_3CH_2O)_5Ta$ | Ethanol | 8 |
| $WO_3$ | $(CH_3CH_2O)_6W$ | Butanol | 7 |
| $SiO_2$ | $(CH_3CH_2O)_4Si$ | Isopropanol | 5 |
| $Al_2O_3$ | $Al(OOC_8H_{15})(OC_3H_7)_2$ | Isopropanol | 11 |

The mixed solution thus obtained is dried at 70° C. for 5 hours, to obtain a powder. Subsequently, the obtained powder is fired at a temperature of 150° C. to 500° C. for several minutes to several hours, to obtain a powder of active material particles having surfaces on which a target oxide layer having a target thickness is formed.

3. Example of Method for Forming Layer of $Li_2O$-$2B_2O_3$ as Oxide Layer

In order to form a layer of $Li_2O$-$2B_2O_3$ on the surfaces of active material particles as the oxide layer, dry blending and a heat treatment can be used in combination, for example.

An example of the method for forming the layer of $Li_2O$-$2B_2O_3$ using the dry blending and the heat treatment in combination will be described later.

First, active material particles, a powder of lithium hydroxide $LiOH \cdot H_2O$, and a powder of boric acid $H_3BO_3$ are mixed at a predetermined weight ratio for obtaining the target thickness of the $Li_2O$-$2B_2O_3$ layer.

Herein, the predetermined mixing ratio can be calculated by a mixed amount $z_{10}$ shown in the following Table 3 and the following formula. Specifically, in Table 3, the value of the mixed amount $z_{10}$ of each of the covering materials required for setting the thickness of the oxide layer to be finally obtained to 10 nm is shown as a representative value. The mixed amount $z_t$ of each of the covering materials required for obtaining an oxide layer having a thickness t (nm) different from 10 nm can be obtained by substituting the target thickness t and the representative value $z_{10}$ of each of the covering materials in the following formula.

$$z_t = z_{10} \times t/10$$

TABLE 3

| Target Oxide Layer | Covering Material | Mixed Amount $z_{10}$ (g) of each of Covering Materials required to form 10-nm-thick Oxide Layer (based on Active Material Particles: 100) |
|---|---|---|
| $Li_2O$—$2B_2O_3$ | $LiOH \cdot H_2O$ | 2 |
|  | $H_3BO_3$ | 5 |

The mixture thus obtained is dried at 500° C. for 10 hours, to obtain a powder of active material particles having surfaces on which a $Li_2O$-$2B_2O_3$ layer having a target thickness is formed.

<Method for Measuring Thickness of First Oxide Layer and Thickness of Second Oxide Layer>

Next, a method for measuring the thickness of a first oxide layer and the thickness of a second oxide layer will be described.

The thickness of the oxide layer can be measured with transmission electron microscopy (TEM). Hereinafter, a specific example of the measuring method of the oxide layer using a transmission electron microscope will be described.

(1) Sampling

First, an electrode which is a measuring subject is provided. An electrode incorporated in a nonaqueous electrolyte battery can be provided in the following procedure. Firstly, a battery subjected to a discharge treatment is disassembled under an inert atmosphere such as argon. An electrode group is taken out from the disassembled nonaqueous electrolyte battery. The taken-out electrode group is separated into a separator, and electrodes which are a positive electrode and a negative electrode by using, for example, tweezers and the like. The electrode thus obtained is immersed in an organic solvent such as ethyl methyl carbonate to wash the electrode. After washing, the electrode is dried. Thus, the electrode can be provided.

The voids of the electrode mixture layer of the provided electrode are filled with a resin. Subsequently, for example, a surface-protective film of tungsten, platinum and the like is formed on the surface of the electrode. A thin sample of about 10 μm square having a thickness of 0.05 μm to 0.2 μm is extracted by a focused ion beam (FIB) method using gallium ions from the surface of the electrode covered with the protective film, i.e., the second portion of the electrode mixture layer. Thus, a sample of the second portion of the electrode mixture layer is obtained.

Subsequently, in the provided electrode, the electrode mixture layer and the current collector are separated from each other using a knife. The cutting surface thus separated is subjected to FIB processing by the irradiation of gallium ions from a direction perpendicular to the cutting surface to extract the thin sample of square of about 10 μm having a thickness of 0.05 μm to 0.2 μm. Thus, a sample of the first portion of the electrode mixture layer is obtained.

The accelerating voltage of the gallium ions during sampling is set to 10 to 40 kV.

(2) Measurement

Active material particles facing a suitable observation direction for a transmission electron beam are selected from the sample of the first portion and the sample of the second portion of the electrode mixture layer obtained as described above. The active material particles are subjected to high resolution TEM observation at a magnification ratio of 300,000 or more. Herein, the suitable observation direction is a direction in which the insertion and extraction of Li ions are caused in the active material particles.

For example, for an active material primary particle having a layered rock salt structure typified by $LiNiO_2$ and $LiCoO_2$, an electron beam is made incident from a [100] direction of a crystal axis on the particle to observe the oxide layer with which a (hk0) surface is covered. In the obtained image, a length from the surface of the oxide layer to the interface between the active material particle and the oxide layer is measured 10 times at optional different places in a direction perpendicular to the axis C of the crystal axis and perpendicular to the incident direction of the electron beam. The average of the lengths thus measured is defined as the thickness of the oxide layer.

For an active material primary particle having a spinel type structure typified by $LiMn_2O_4$, an electron beam is made incident from a [100] direction of a crystal axis on the particle to observe the oxide layer with which the surface of the particles in a [010] direction is covered. In the obtained image, a length from the surface of the oxide layer to the interface between the active material particle and the oxide layer is measured 10 times at optional different places in the [010] direction. The average of the lengths thus measured is defined as the thickness of the oxide layer.

For an active material primary particle having an olivine type iron phosphate structure typified by $LiFePO_4$, an electron beam is made incident from a [100] direction of a crystal axis on the particle to observe the oxide layer with which the surface of the particles in a [010] direction is covered. In the obtained image, a length from the surface of the oxide layer to the interface between the active material and the oxide layer is measured 10 times at optional different places in the [010] direction. The average of the lengths thus measured is defined as the thickness of the oxide layer.

Next, a method for confirming the compositions of the active material particles, and first and second oxide layers will be described.

(Regarding Active Material Particles)

The composition of the active material particles can be confirmed by identifying a substance from crystal structure analysis and composition analysis, and confirming distribution from cross-sectional observation. Specifically, the composition of the active material particles can be confirmed, for example, in the following procedure. First, only an electrode mixture layer applied to a current collector is stripped off by a cutter and the like, and an X-ray diffraction pattern is obtained by an X-ray diffraction method using Cu-Kα rays. Information on the crystal structure and lattice constant of the active material are obtained from the diffraction pattern. Next, the compositions of metal elements are quantified using inductively-coupled plasma emission spectrometry. Thus, the composition of the active material is confirmed. When a different active material is used for each electrode mixture layer, a metal element mapping image of the cross-section of a positive electrode is obtained using a scanning electron microscope and energy dispersive X-ray spectroscopy (EDX), and the kind of the active material in each mixture layer is confirmed. The Kα rays of Mn, Fe, Co, and Ni are utilized to identify the metal elements. A sample for measuring the cross-section of the electrode is produced by cross-sectional ion milling by an argon ion source. A fragment of about 2 cm×2 cm is cut out from an electrode sheet by a cutter and the like, and one cross-section is irradiated with argon ions accelerated at an accelerating voltage of 2 to 6 KV, to produce a flat cross-section.

(Regarding Oxide Layer)

The composition of the oxide layer can be confirmed using EDX or electron energy-loss spectroscopy (EELS) together with TEM. Specifically, the composition can be confirmed in the following procedure. A measurement sample is produced in the same manner as in the above-mentioned sample processing for measuring the thickness of the oxide layer. Compositions other than Li and B can be confirmed by using EDX. The oxide layer is irradiated with an electron beam accelerated at 200 KV, to confirm the compositions of the metal elements from Mg-Kα, Ca-Kα, Al-Kα, Si-Kα, P—Kα, Fe-Kα, Mn-Kα, Co-Kα, Ni-Kα, Cu-Kα, Zn-Kα, Zr-Lα, Nb-Lα, Mo-Lα, and Ta-Mα. Li and B are confirmed using EELS. The oxide layer is irradiated with an electron beam accelerated at 200 KV, to confirm the composition from the peaks of a Li—K absorption end and B—K absorption end in the EELS spectrum.

The thickness of the electrode mixture layer, the thickness of the first portion of the electrode mixture layer, and the thickness of the second portion of the electrode mixture layer can be measured, for example, in the following procedure.

Thin samples are produced at intervals of about 10% of the thickness of the electrode mixture layer in the thickness direction of the electrode using FIB from the surface of the electrode mixture layer, and the thickness of the oxide layer of each sample is measured. The measured values of the obtained oxide layers are defined as t10%, t20%, t30%, t40%, t50%, t60%, t70%, t80%, and t90% in order from the surface of the electrode mixture layer. In a polygonal line graph in which plotted points are connected by a straight line with the thickness of the oxide layer in each measurement position as a vertical axis and a depth from the surface of the electrode mixture layer in the thin sample-acquired region as a horizontal axis, a depth from the surface of the electrode mixture layer when the value of the vertical axis crosses $(½)×(t90\%+t10\%)$ is defined as D1. The thickness of the first portion of the electrode mixture layer is calculated by T1=T−D1. In the polygonal line graph, a depth from the surface of the electrode mixture layer when the value of the vertical axis crosses $(½)×(t90\%+t10\%)$ or $(½)×(t10\%)$ is defined as D2. D2 is the thickness of the second portion of the electrode mixture layer.

Next, a specific example of an electrode according to a first embodiment will be described with reference to the drawings.

FIG. 1 show a schematic sectional view of an electrode as an example according to a first embodiment and schematic sectional views of active material particles respectively contained in a first portion and second portion of an electrode mixture layer of the electrode.

An electrode 10 shown in FIG. 1 includes a current collector 11 and an electrode mixture layer 12 supported on one surface of the current collector 11. The electrode mixture layer 12 contains active material particles 120, a conductive agent 130, and a binder 140. In FIG. 1, the active material particles 120 are shown as a gray area; the conductive agent 130 is shown as a white area; and the binder 140 is shown as a line.

The electrode mixture layer 12 includes a first surface 12a. The first surface is in contact with the current collector 11. The electrode mixture layer 12 includes a second surface 12b separated by the thickness T of the electrode mixture layer 12 from the first surface 12a.

The electrode mixture layer 12 includes a first portion $12_1$ including the first surface 12a and a second portion $12_2$ including the second surface 12b.

The first portion $12_1$ of the electrode mixture layer 12 has a thickness $T_1$ equivalent to 50% of the thickness T of the electrode mixture layer 12. The second portion $12_2$ of the electrode mixture layer 12 has a thickness $T_2$ equivalent to 50% of the thickness T of the electrode mixture layer 12.

In the first portion $12_1$ of the electrode mixture layer 12, the active material particles 120 are covered with a first oxide layer 121 having a thickness $t_1$. On the other hand, in the second portion $12_2$ of electrode mixture layer 12, the active material particles 120 are covered with a second oxide layer 122 having a thickness $t_2$. Herein, the thickness $t_1$ of the first oxide layer 121 is more than the thickness $t_2$ of the second oxide layer 122.

In the electrode according to the first embodiment, the thickness of the first oxide layer formed on the surfaces of the active material particles contained in the first portion of the electrode mixture layer is more than the thickness of the second oxide layer formed on the surfaces of the active material particles contained in the second portion of the electrode mixture layer. Because of this, in the electrode according to the first embodiment, the deviation of the deterioration in the active material in the electrode mixture layer can be eliminated while the decrease in the capacity of the electrode is suppressed. That is, the electrode according to the first embodiment can achieve a nonaqueous electrolyte battery capable of exhibiting a high energy density and an excellent capacity retention.

Second Embodiment

According to a second embodiment, a nonaqueous electrolyte battery is provided. This nonaqueous electrolyte battery includes a positive electrode, a negative electrode, and a nonaqueous electrolyte. The positive electrode is the electrode according to the first embodiment.

Hereinafter, the nonaqueous electrolyte battery according to the second embodiment will be described in detail.

The positive electrode is the electrode according to the first embodiment. Hereinafter, the current collector, electrode mixture layer, and active material particles of the positive electrode are respectively referred to as a positive electrode current collector, a positive electrode mixture layer, and positive electrode active material particles in order to discriminate the positive electrode from the negative electrode. An electrode tab which can be included in the current collector of the electrode according to the first embodiment can function as a positive electrode tab. Alternatively, the positive electrode can also include a positive electrode tab as a separate part from the positive electrode current collector.

The negative electrode can include a negative electrode current collector and a negative electrode mixture layer supported on at least one surface of the negative electrode current collector. The negative electrode current collector can include a portion on which the negative electrode mixture layer is not supported on a surface thereof. The portion can function as a negative electrode tab. Alternatively, the negative electrode can also include a negative electrode tab which is a separate part from the negative electrode current collector.

The positive electrode and the negative electrode can constitute an electrode group. In the electrode group, the positive electrode mixture layer and the negative electrode mixture layer can be opposed to each other via, for example, a separator.

The electrode group can have various structures. For example, the electrode group can have a stack type structure. The electrode group having the stack type structure can be obtained by laminating, for example, a plurality of positive electrodes and negative electrodes with the separator sandwiched between the positive electrode mixture layer and the negative electrode mixture layer. Alternatively, the electrode group can have a coiled-type structure. The coiled-type electrode group can be obtained, for example, by laminating a separator, a positive electrode, another separator, and a negative electrode in this order to produce a laminated body, and coiling the laminated body so that the negative electrode is positioned outside.

The nonaqueous electrolyte battery according to the second embodiment can further include a positive electrode terminal and a negative electrode terminal.

The positive electrode terminal can function as a conductor for electron transfer between the positive electrode and an external circuit when a part of the positive electrode terminal is electrically connected to a part of the positive electrode. The positive electrode terminal can be connected to, for example, the positive electrode current collector, particularly the positive electrode tab. Similarly, the negative electrode terminal can function as a conductor for electron transfer between the negative electrode and an external terminal when a part of the negative electrode terminal is electrically connected to a part of the negative electrode. The negative electrode terminal can be connected to, for example, the negative electrode current collector, particularly the negative electrode tab.

The nonaqueous electrolyte battery according to the second embodiment can further include a case. The case can store the electrode group and the nonaqueous electrolyte. The electrode group may be impregnated with the nonaqueous electrolyte in the case. A part of each of the positive electrode terminal and negative electrode terminal can be extended out from the case.

Hereinafter, the positive electrode, the negative electrode, the nonaqueous electrolyte, the separator, the positive electrode terminal, the negative electrode terminal, and the case will be described in more detail.

(1) Positive Electrode

As materials which can be used for the positive electrode, the materials described in the description of the first embodiment can be used.

(2) Negative Electrode

The negative electrode mixture layer which can be included in the negative electrode can contain a negative electrode active material, a conductive agent, and a binder.

As the negative electrode active material, materials in which a charge and discharge reactions can occur when it is used in combination with the active material particles contained in the positive electrode can be used, for example.

The negative electrode active material is preferably a substance of which a lithium insertion-and-extraction potential is higher than a redox potential of lithium by a value of 1 V or more. The use of the negative electrode active material containing the substance can suppress the precipitation of lithium dendrite during charge-and-discharge cycles, which can suppress the decrease in lithium ions in the nonaqueous electrolyte battery system. Because of this, such a nonaqueous electrolyte battery can suppress deterioration in the diffusibility of the lithium ions during charge-and-discharge cycles, and can eventually exhibit a more excellent capacity retention.

An example of a substance of which a lithium insertion-and-extraction potential is higher than a redox potential of lithium by a value of 1 V or more is lithium titanium oxide. Examples of the lithium titanium oxide include lithium titanate having a spinel type structure ($Li_{4+x}Ti_5O_{12}$ (x varies between 0 and 3 depending on charge-and-discharge states)) and lithium titanate having a ramsdellite type structure ($Li_{2+x}Ti_3O_7$ (x varies between 0 to 2 depending on charge-and-discharge states)). When the lithium titanium oxide is used as the negative electrode active material, a single the negative electrode active material may be used, or a mixture of two or more lithium titanium oxides.

The lithium-ion insertion potential of the lithium titanium oxide is preferably 1 V (vs. $Li/Li^+$) or more. The lithium titanate having a spinel type structure and the lithium titanate having a ramsdellite type structure exhibit a lithium-ion insertion potential of 1 V (vs. $Li/Li^+$) or more. The upper limit of the lithium-ion insertion potential of the lithium titanium oxide is preferably 2 V or less.

The lithium titanium oxide preferably has an average primary particle size of 5 μm or less. When the average primary particle size is 5 μm or less, an effective area contributing to an electrode reaction can be sufficiently secured. Therefore, good discharge characteristics with a large current can be obtained.

The lithium titanium oxide preferably has a specific surface area of 1 to 10 $m^2/g$. When the specific surface area is 1 $m^2/g$ or more, an effective area contributing to an electrode reaction can be sufficient. Therefore, good discharge characteristics with a large current can be obtained. On the other hand, when the specific surface area is 10 $m^2/g$ or less, a reaction with a nonaqueous electrolyte can be suppressed. Therefore, lowering of a charge-and-discharge efficiency and gas generation during storage can be suppressed.

Other examples of the negative electrode active material include a titanium oxide which transforms a lithium titanium oxide during charging and discharging. The example of the titanium oxide is $TiO_2$. $TiO_2$ can have a lithium insertion-and-extraction potential of 1 V (vs. $Li/Li^+$) or more.

Alternatively, a carbon material can also be used as the negative electrode active material.

The conductive agent can be blended, as necessary, to improve the current collection performance and suppress the contact resistance between the active material and current collector. Examples of the conductive agent for a negative electrode include a carbon material. The carbon material is preferably high in performance of absorbing an alkali metal, and electroconductivity. Examples of the carbon material include acetylene black and carbon black.

The binder can bind the active material and the current collector. Examples of the binder for the negative electrode include polytetrafluoroethylene (PTFE), polyvinylidene fluoride (PVdF), fluorine-based rubber, styrene-butadiene rubber (SBR), polypropylene (PP), polyethylene (PE), and carboxymethyl cellulose (CMC).

The negative electrode current collector may be, for example, a sheet containing a material high in electrical conductivity. As the negative electrode current collector, for example, an aluminum foil or an aluminum alloy foil may be used. When the aluminum foil or the aluminum alloy foil is used, the thickness is, for example, 20 μm or less, and preferably 15 μm or less. The aluminum alloy foil can contain magnesium, zinc, and silicon and the like. The content of transition metals such as iron, copper, nickel, and chromium contained in the aluminum alloy foil is preferably 1% or less.

The negative electrode can be produced in the following procedure, for example.

First, a negative electrode active material, a conductive agent, and a binder are provided. These are introduced into a suitable solvent to prepare a negative electrode slurry. In this case, it is preferable that the weight percentages of the negative electrode active material, negative electrode conductive agent, and negative electrode binder which are introduced into the solvent are respectively 70 to 95% by weight, 0 to 20% by weight, and 2 to 10% by weight.

The slurry thus obtained is applied to the surface of the negative electrode current collector, dried, and pressed. Thus, the negative electrode which includes the negative electrode current collector and the negative electrode mixture layer supported on the negative electrode current collector can be obtained.

(3) Nonaqueous Electrolyte

A nonaqueous electrolytic solution contains a nonaqueous solvent, and an electrolyte dissolved in the nonaqueous solvent.

The electrolyte is, for example, an alkali salt, and preferably a lithium salt. Examples of the lithium salt include lithium hexafluorophosphate ($LiPF_6$), lithium tetrafluoroborate ($LiBF_4$), lithium hexafluoroarsenate ($LiAsF_6$), lithium perchlorate ($LiClO_4$), and lithium trifluoromethanesulfonate ($LiCF_3SO_3$). Preferred examples of the electrolyte include lithium hexafluorophosphate ($LiPF_6$) or lithium tetrafluoroborate ($LiBF_4$). The concentration of the electrolyte in the nonaqueous electrolytic solution is preferably 0.5 to 2 mol/L.

Any known nonaqueous solvents used in the lithium ion battery may be used as the nonaqueous solvent. First examples of the nonaqueous solvent include cyclic carbonates such as ethylene carbonate (EC) and propylene carbonate (PC). Second examples of the second nonaqueous solvent include linear carbonate such as dimethyl carbonate, methyl ethyl carbonate, and diethyl carbonate; γ-butyrolactone; acetonitrile; methyl propionate; ethyl propionate; cyclic ethers such as tetrahydrofuran and 2-methyl tetrahydrofuran; and linear ethers such as dimethoxyethane and diethoxyethane. The solvent of the second examples generally has a viscosity lower than that of the solvent of the first examples. The nonaqueous solvent may be a solvent obtained by mixing the first solvent with the second solvent.

(4) Separator

The separator may be made of an insulating material, and can prevent the electrical contact of the positive electrode with the negative electrode. Preferably, the separator is made of a material through which the electrolyte can pass, or has a shape through which the electrolyte can pass. Examples of the separator include a non-woven fabric made of a synthetic resin, a porous polyethylene film, a porous polypropylene film, and a cellulose-based separator.

(5) Positive Electrode Terminal and Negative Electrode Terminal

The positive electrode terminal and the negative electrode terminal are preferably made of a material having high electrical conductivity. If each of the terminals is connected to the current collector, these terminals are preferably made of the same material as that of the current collector in order to reduce contact resistance.

(6) Case

As the case, a case formed of a laminate film having a thickness of 0.5 mm or less or a metal case having a film-thickness of 1 mm or less can be used. The laminate film more preferably has a thickness of 0.2 mm or less. The metal case has a film-thickness of, more preferably 0.5 mm or less, and still more preferably 0.2 mm or less.

Examples of the shape of the case include a flat type (thin type), rectangular type, cylindrical type, coin type, and button type. Examples of the case include a case for a small battery which is to be loaded into a portable electronic device or a case for a large battery which is to be loaded into a two- or four-wheeled vehicle, depending on the size of the battery.

The laminate film used is a multilayer film including resin layers and a metal layer sandwiched between the resin layers. The metal layer is preferably an aluminum foil or an aluminum alloy foil for reducing the weight. The resin layer may be, for example, a polymeric material such as polypropylene (PP), polyethylene (PE), nylon, or polyethylene terephthalate (PET). The laminate film may be heat-sealed to be formed into the shape of a case.

The metal case is made of aluminum or an aluminum alloy and the like. As the aluminum alloy, an alloy containing an element such as magnesium, zinc, or silicon is preferable. If a transition metal such as iron, copper, nickel, or chromium is contained in the alloy, the content thereof is preferably set to 1% by weight or less. Thus, long-term reliability in a high-temperature environment and a heat-releasing property can be dramatically improved.

Next, a specific example of the nonaqueous electrolyte battery according to the second embodiment will be described with reference to the drawings.

FIG. 2 is a partially cutout perspective view of a nonaqueous electrolyte battery as an example according to a second embodiment. FIG. 3 is an enlarged sectional view of a part A of the nonaqueous electrolyte battery shown in FIG. 2.

A nonaqueous electrolyte battery 100 shown in FIGS. 2 and 3 includes a flat-type electrode group 1.

The flat-type electrode group 1 includes a negative electrode 2, a positive electrode 3, and a separator 4.

The negative electrode 2 includes a negative electrode current collector 21 and a negative electrode mixture layer 22 supported on the negative electrode current collector 21, as shown in FIG. 3. The positive electrode 3 includes a positive electrode current collector 31 and a positive electrode mixture layer 32 supported on the positive electrode current collector 31, as shown in FIG. 3. The positive electrode mixture layer 32 is the same as the electrode mixture layer 12 described with reference to FIG. 1.

In the electrode group 1, the negative electrode 2 and the positive electrode 3 are laminated in a state where the separator 4 is sandwiched between the negative electrode mixture layer 22 and the positive electrode mixture layer 32. Such an electrode group 1 can be obtained according to the following procedure. First, a plate-like negative electrode 2 and a plate-like positive electrode 3 are laminated with a separator 4 sandwiched therebetween. Next, another separator 4 is laminated on a positive electrode mixture layer 32 which is not opposed to the negative electrode 2, to produce a laminated body. The laminated body is coiled with the negative electrode 2 located outside. Then, a core is extracted, and the laminated body is then pressed to form the laminated body into a flat shape. Thus, the electrode group 1 shown in FIGS. 2 and 3 can be obtained.

A belt-like negative electrode terminal 5 is electrically connected to the negative electrode 2. A belt-like positive electrode terminal 6 is electrically connected to the positive electrode 3.

The nonaqueous electrolyte battery 100 shown in FIGS. 2 and 3 further includes a laminate-film pouch 7 as the case.

The electrode group 1 is stored in the laminate film pouch 7 in a state that respective ends of the negative electrode terminal 5 and positive electrode terminal 6 are extended out from the pouch 7. The laminate-film pouch 7 stores a nonaqueous electrolytic solution (not shown). The electrode group 1 is impregnated with the nonaqueous electrolyte.

The nonaqueous electrolyte battery 100 shown in FIGS. 2 and 3 can be produced as follows, for example. First, an electrode group 1 is stored in a laminate-film pouch 7 in a state that a negative electrode terminal 5 and a positive electrode terminal 6 are extended out from the laminate-film pouch 7. Then, the outer edge part of the pouch 7 is heat-sealed with the opening of the pouch 7 partially left. Subsequently, a nonaqueous electrolyte is injected into the pouch 7 through the previously left opening. By sealing the previously left opening after injection, a nonaqueous electrolyte battery 100 can be produced, in which the electrode group 1 and the nonaqueous electrolytic solution are sealed in the pouch 7.

The nonaqueous electrolyte battery according to the second embodiment includes the electrode according to the first embodiment as the positive electrode. Because of this, the nonaqueous electrolyte battery according to the second embodiment can exhibit a high energy density and an excellent capacity retention.

EXAMPLES

Hereinafter, Examples will be described. However, the present invention is not limited to the following Examples, without departing from the spirit of the present invention.

Example 1-1

In Example 1, a nonaqueous electrolyte battery 100 shown in FIGS. 2 and 3 was produced in the following procedure.

<Production of Positive Electrode 3>

(1) Preparation of First Slurry

As positive electrode active material particles, lithium nickel cobalt oxide ($LiNi_{0.8}Co_{0.2}O_2$) was provided.

On the other hand, nickel acetate tetrahydrate ($Ni(CH_3COO)_2 \cdot 4H_2O$) as a covering material was introduced into distilled water, and the distilled water was stirred at room temperature for 10 hours. Thus, a solution in which the covering material was dissolved was obtained.

Subsequently, the previously provided positive electrode active material particles were introduced into the solution in which the covering material was dissolved, and the solution was further stirred at room temperature for 10 hours. Thus, a mixed solution was obtained.

Herein, the weight ratio of nickel acetate tetrahydrate: lithium nickel cobalt oxide:water in the mixed solution was set to 22:100:300.

The mixed solution thus obtained was dried at 120° C. for 5 hours, to obtain a powder. Subsequently, the obtained powder was subjected to a heat treatment at 500° C. for 5 hours, to obtain a positive electrode active material composite powder. When the positive electrode active material composite powder was analyzed by the previously described method, it was found that the positive electrode active material composite powder contains lithium nickel cobalt oxide and nickel monoxide (NiO).

Next, 91% by weight of the positive electrode active material composite powder, 2.5% by weight of acetylene black, 3% by weight of graphite, and 3.5% by weight of polyvinylidene fluoride (PVdF) were added to N-methyl-pyrrolidone (NMP), followed by mixing, to prepare a first slurry.

(2) Preparation of Second Slurry

A second slurry was prepared in the same manner as in the first slurry except that the weight ratio of nickel acetate tetrahydrate:lithium nickel cobalt oxide:water was set to 11:100:300 to obtain a mixed solution. When an active material composite powder obtained from the mixed solution thus obtained was analyzed by the previously described method, it was found that the active material composite powder contains lithium nickel cobalt oxide and nickel monoxide (NiO).

(3) Production of Positive Electrode 3

The first slurry was applied to each of both surfaces of a positive electrode current collector 31 made of a 15-μm-thick aluminum foil, dried, and pressed. When the application, a portion to which the first slurry was not applied was left on the positive electrode current collector 31. Subsequently, a second slurry was applied to the dried coated film, and dried. Finally, the coated film supported on each of both surfaces of the positive electrode current collector 31 was pressed. Thus, a positive electrode 3 was produced, which included the positive electrode current collector 31 and a positive electrode mixture layer 32 supported on each of both surfaces of the positive electrode current collector 31 and having a density of 3.0 g/cm$^3$.

By the previously shown method, the thickness T of the obtained positive electrode mixture layer 32, the thickness $T_1$ of a first portion 12$_1$ of the positive electrode mixture layer 32, and the thickness $T_2$ of a second portion 12$_2$ of the positive electrode mixture layer 32 were measured. As a result, it was found that the thickness T is 80 μm; the thickness $T_1$ is 40 μm; and the thickness $T_2$ is 40 μm.

(4) Connection of Positive Electrode Terminal 6

A belt-like positive electrode terminal 6 was electrically connected to the portion to which the slurry had not been applied in the positive electrode current collector 31 by ultrasonic joining.

<Production of Negative Electrode 2>

93% by weight of a graphite powder as a negative electrode active material and 7% by weight of PVdF were added to NMP, followed by mixing, to prepare a slurry. The slurry was applied to each of both surfaces of a negative electrode current collector 21 made of a 15-μm-thick copper foil, dried, and pressed. When the application, a portion to which the slurry was not applied was left on the negative electrode current collector 21. Thus, a negative electrode 2 was produced, which included the negative electrode current collector 21 and a negative electrode mixture layer 22 supported on each of both surfaces of the negative electrode current collector 21 and having a density of 1.3 g/cm$^3$.

A belt-like negative electrode terminal 5 was electrically connected to the portion on which the slurry had not been applied in the negative electrode current collector 21 by ultrasonic joining.

<Production of Electrode Group 1>

The positive electrode 3 produced as described above, a separator 4 made of a porous polyethylene film having a thickness of 20 μm, the negative electrode 2 produced as described above, and another separator 4 were laminated onto each other in this order, and then the laminated body was coiled into a spiral form such that the negative electrode was positioned at the outmost side. In this way, an electrode group 1 was produced. After a core was extracted, the electrode group 1 was hot-pressed at 90° C. to produce a flat-shaped electrode group 1 having a width of 58 mm, a height of 95 mm and a thickness of 3.0 mm. The obtained electrode group 1 was stored in a pouch 7 made of a laminate film having a thickness of 0.1 mm. The laminate film was composed of an aluminum foil having a thickness of 40 μm and a polypropylene layer formed on each of both surfaces of the aluminum foil. In this case, the ends of the positive electrode terminal 6 and negative electrode terminal 5 were extended out from the pouch 7. Subsequently, the electrode group 1 stored in the pouch 7 was vacuum-dried at 80° C. for 24 hours. Subsequently, the outer edge part of the pouch 7 was heat-sealed in a state where the ends of the positive electrode terminal 6 and negative electrode terminal 5 were extended out from the pouch 7, and the opening of the pouch 7 was partially left.

<Preparation of Nonaqueous Electrolyte>

Ethylene carbonate (EC) and methylethyl carbonate (MEC) were mixed with each other at a ratio by volume of 1:2 to prepare a mixed solvent. Into this mixed solvent, lithium hexafluorophosphate (LiPF$_6$) is dissolved into this mixed solvent in a concentration of 1.0 mol/L to prepare a nonaqueous electrolytic solution.

<Production of Battery>

The previously prepared nonaqueous electrolyte was injected into the pouch 7 via the opening left during heat-sealing, and the opening was then closed. Thus, a nonaqueous electrolyte battery 100 of Example 1-1 was produced, which had a structure shown in FIGS. 2 and 3.

<Measurement of Capacity Retention>

The nonaqueous electrolyte battery 100 of Example 1-1 was charged at a rate of 0.2 C in an environment of 25° C. to 2.8 V, and then discharged at a rate of 0.2 C until the voltage thereof reached 1.5 V. Thereafter, the battery was recharged at a rate of 1 C, and then discharged at a rate of 1 C. An initial capacity thereof was then measured. Thus, an initial discharge capacity $Q_0$ was obtained.

Next, the nonaqueous electrolyte battery 100 of Example 1-1 was charged and discharged 10000 times at a rate of 1 C in an environment of 25° C., and then charged and discharged once at a rate of 1 C. A discharge capacity $Q_1$ after cycle deterioration was measured.

The initial discharge capacity $Q_0$ thus obtained and the discharge capacity $Q_1$ after cycle deterioration were substituted for the following formula 1, to obtain a capacity retention R.

$$R=(Q_1/Q_0)\times 100 \qquad \text{(formula 1)}$$

<Measurement of Thicknesses of First Oxide Layer and Second Oxide Layer>

There were obtained TEM images for the portion formed using the first slurry and portion formed using the second slurry in the positive electrode mixture layer 32 using the previously described method. The TEM image of the portion formed using the first slurry in the positive electrode mixture layer 32 is shown in FIG. 4, and the TEM image of the portion formed using the second slurry is shown in FIG. 5.

Figure 4:
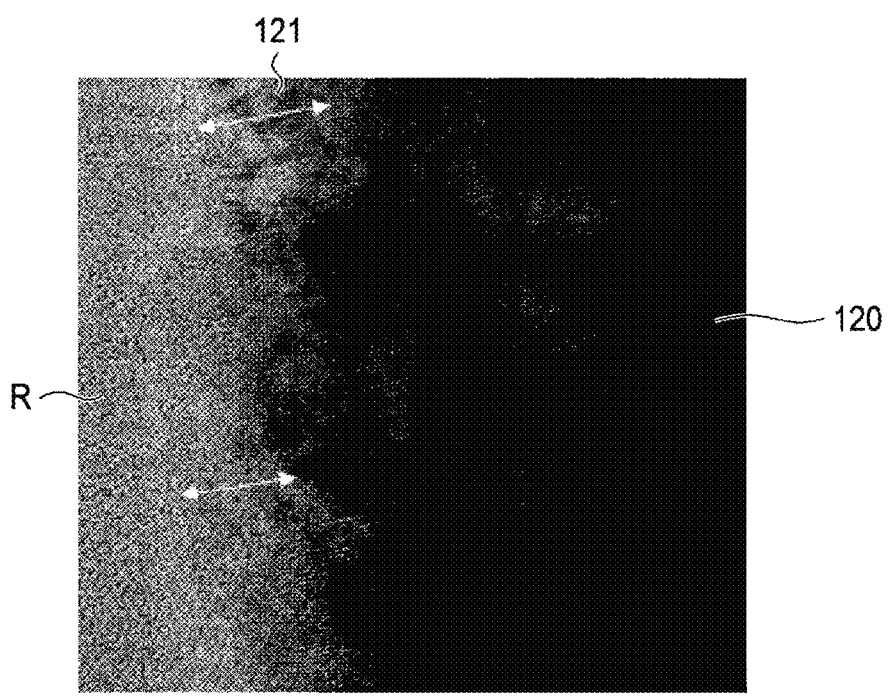
FIG. 4 shows a cross-sectional TEM image of a part of an electrode of Example 1-1.

An area 120 which is present on a right side in a field shown in FIG. 4 and has low brightness shows a lithium nickel cobalt oxide particle. An area R which is present on a left side in the visual field shown in FIG. 4 and has high brightness shows a resin with which the voids of the positive electrode mixture layer 32 are filled for TEM observation. An area 121 which is present between the lithium nickel cobalt oxide particles and the resin in the visual field shown in FIG. 4 and has medium brightness shows a nickel monoxide layer.

A length shown by an arrow in FIG. 4 is the length of the nickel monoxide layer 121 in a direction perpendicular to the axis C of the crystal axis of the lithium nickel cobalt oxide and to the incident direction of an electron beam, i.e., the thickness of the nickel monoxide layer 121. When the thicknesses of the nickel monoxide layer 121 at ten places were measured, and averaged, the thickness $t_1$ of the nickel monoxide layer 121 in the portion formed using the first slurry was 20 μm.

Figure 5:
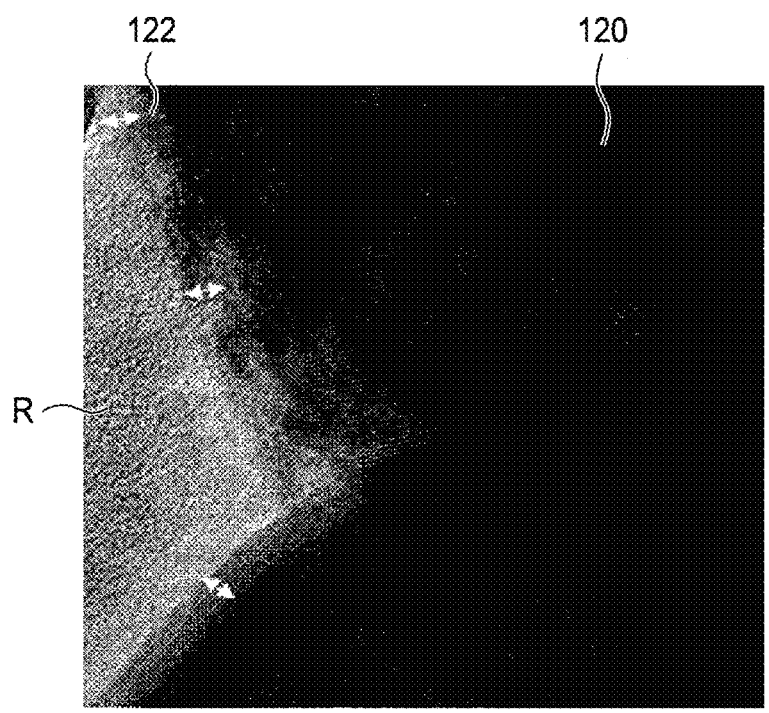
FIG. 5 shows a cross-sectional TEM image of another part of the electrode of Example 1-1.

An area 120 which constitutes a large portion from a right side in a visual field shown in FIG. 5 and has low brightness shows a lithium nickel cobalt oxide particle. An area R which is present on a left side in the visual field shown in FIG. 5 and has high brightness shows a resin with which the voids of the positive electrode mixture layer 32 are filled for TEM observation. An area 122 which is present between the lithium nickel cobalt oxide particles and the resin in the visual field shown in FIG. 5 and has medium brightness shows a nickel monoxide layer.

A length shown by an arrow in FIG. 5 is the length of the nickel monoxide layer 122 in a direction perpendicular to the axis C of the crystal axis of the lithium nickel cobalt oxide and to the incident direction of an electron beam, i.e., the thickness of the nickel monoxide layer 122. When the thicknesses of the nickel monoxide layer 122 at ten places were measured, and averaged, the thickness $t_2$ of the nickel monoxide layer 122 in the portion formed using the second slurry was 10 μm.

Example 1-2 to Example 1-23

In Example 1-2 to Example 1-23, nonaqueous electrolyte batteries 100 of Example 1-2 to Example 1-23 were produced in the same manner as in Example 1-1 except that the preparation conditions of a mixed solution for preparing a first slurry were changed as described previously so that a target first oxide layer 121 shown in the following Tables 4 and 5 and having a thickness $t_1$ was obtained, and that the preparation conditions of a mixed solution for preparing a second slurry were changed as described previously so that a target second oxide layer 122 shown in the following Tables 4 and 5 and having a thickness $t_2$ was obtained.

Comparative Example 1-1

In Comparative Example 1-1, a nonaqueous electrolyte battery of Comparative Example 1-1 was produced in the same manner as in Example 1-1 except that a positive electrode active material particle powder subjected to no nickel acetate processing was used in place of the positive electrode active material composite powder when a first slurry and a second slurry for producing a positive electrode were produced. That is, the nonaqueous electrolyte battery of Comparative Example 1-1 contains neither a first oxide layer nor a second oxide layer.

Comparative Example 1-2

In Comparative Example 1-2, a nonaqueous electrolyte battery of Comparative Example 1-2 was produced in the same manner as in Example 1 except that a positive electrode active material particle powder subjected to no nickel acetate processing was used in place of the positive electrode active material composite powder when a first slurry for producing a positive electrode was produced. That is, the nonaqueous electrolyte battery of Comparative Example 1-2 does not contain a first oxide layer.

Comparative Examples 1-3 to 1-5

In Comparative Example 1-3 to Comparative Example 1-5, nonaqueous electrolyte batteries of Comparative Example 1-3 to Comparative Example 1-5 were produced in the same manner as in Example 1-1 except that the preparation conditions of a mixed solution for preparing a first slurry were changed as described previously so that a target first oxide layer 121 shown in the following Table 6 and having a thickness $t_1$ was obtained, that and the preparation conditions of a mixed solution for preparing a second slurry were changed as described previously so that a target second oxide layer 122 shown in the following Table 6 and having a thickness $t_2$ was obtained.

<Evaluation>

In Example 1-2 to Example 1-23 and Comparative Example 1-2 to Comparative Example 1-5, the first oxide layer and the second oxide layer were identified in the same manner as in Example 1-1 before the first slurry and the second slurry were prepared. The results are shown in the following Tables 4 to 6.

In Example 1-2 to Example 1-23, the thickness T of the positive electrode mixture layer 32, the thickness $T_1$ of the first portion $12_1$ of the positive electrode mixture layer 32, and the thickness $T_2$ of the second portion $12_2$ of the positive electrode mixture layer 32 were measured in the same manner as in Example 1-1. As a result, the thickness T of the positive electrode mixture layer 32, the thickness $T_1$ of the first portion $12_1$ of the positive electrode mixture layer 32, and the thickness $T_2$ of the second portion $12_2$ of the positive electrode mixture layer 32 were the same as those of Example 1-1.

The nonaqueous electrolyte batteries 100 of Example 1-2 to Example 1-23, and the nonaqueous electrolyte batteries of Comparative Example 1-1 to Comparative Example 1-5 were measured for the capacity retention and the thicknesses of the first oxide layer and second oxide layer using the same procedure as that in the nonaqueous electrolyte battery 100 of Example 1-1. The results are shown in the following Tables 4 to 6. In Tables 4 to 6, the capacity retention of each of the nonaqueous electrolyte batteries is shown as a relative value when the capacity retention of the nonaqueous electrolyte battery of Comparative Example 1-1 is defined as 100.

TABLE 4

*Negative Electrode Active Material: Graphite

| | Positive Electrode Active Material Particles 120 of First Portion $12_1$ of Positive Electrode Mixture Layer 32 | First Oxide Layer 121 | Thickness $t_1$ (nm) of First Oxide Layer 121 | Positive Electrode Active Material Particles 120 of Second Portion $12_2$ of Positive Electrode Mixture Layer 32 | Second Oxide Layer 122 | Thickness $t_2$ (nm) of Second Oxide Layer 122 | Ratio r (=$t_1/t_2$) of Thicknesses of Oxide Layers | Capacity Retention (Relative Value) |
|---|---|---|---|---|---|---|---|---|
| Example 1-1 | LiNi$_{0.8}$Co$_{0.2}$O$_2$ | NiO | 20 | LiNi$_{0.8}$Co$_{0.2}$O$_2$ | NiO | 10 | 2 | 107 |
| Example 1-2 | LiNi$_{0.8}$Co$_{0.2}$O$_2$ | NiO | 2 | LiNi$_{0.8}$Co$_{0.2}$O$_2$ | NiO | 1 | 2 | 101 |

TABLE 4-continued

*Negative Electrode Active Material: Graphite

| | Positive Electrode Active Material Particles 120 of First Portion $12_1$ of Positive Electrode Mixture Layer 32 | First Oxide Layer 121 | Thickness $t_1$ (nm) of First Oxide Layer 121 | Positive Electrode Active Material Particles 120 of Second Portion $12_2$ of Positive Electrode Mixture Layer 32 | Second Oxide Layer 122 | Thickness $t_2$ (nm) of Second Oxide Layer 122 | Ratio r ($=t_1/t_2$) of Thicknesses of Oxide Layers | Capacity Retention (Relative Value) |
|---|---|---|---|---|---|---|---|---|
| Example 1-3 | $LiNi_{0.8}Co_{0.2}O_2$ | NiO | 80 | $LiNi_{0.8}Co_{0.2}O_2$ | NiO | 15 | 5.3 | 110 |
| Example 1-4 | $LiNi_{0.8}Co_{0.2}O_2$ | NiO | 20 | $LiNi_{0.8}Co_{0.2}O_2$ | NiO | 1 | 20 | 122 |
| Example 1-5 | $LiNi_{0.8}Co_{0.2}O_2$ | NiO | 100 | $LiNi_{0.8}Co_{0.2}O_2$ | NiO | 2 | 50 | 115 |
| Example 1-6 | $LiNi_{0.8}Co_{0.2}O_2$ | NiO | 100 | $LiNi_{0.8}Co_{0.2}O_2$ | NiO | 0.5 | 200 | 103 |
| Example 1-7 | $LiNi_{0.8}Co_{0.2}O_2$ | CoO | 5 | $LiNi_{0.8}Co_{0.2}O_2$ | CoO | 2 | 2.5 | 103 |
| Example 1-8 | $LiNi_{0.8}Co_{0.2}O_2$ | CoO | 50 | $LiNi_{0.8}Co_{0.2}O_2$ | CoO | 10 | 5 | 111 |
| Example 1-9 | $LiNi_{0.8}Co_{0.2}O_2$ | MnO | 10 | $LiNi_{0.8}Co_{0.2}O_2$ | MnO | 4 | 2.5 | 104 |
| Example 1-10 | $LiNi_{0.8}Co_{0.2}O_2$ | MnO | 60 | $LiNi_{0.8}Co_{0.2}O_2$ | MnO | 15 | 4 | 110 |

TABLE 5

*Negative Electrode Active Material: Graphite

| | Positive Electrode Active Material Particles 120 of First Portion $12_1$ of Positive Electrode Mixture Layer 32 | First Oxide Layer 121 | Thickness $t_1$ (nm) of First Oxide Layer 121 | Positive Electrode Active Material Particles 120 of Second Portion $12_2$ of Positive Electrode Mixture Layer 32 | Second Oxide Layer 122 | Thickness $t_2$ (nm) of Second Oxide Layer 122 | Ratio r ($=t_1/t_2$) of Thicknesses of Oxide Layers | Capacity Retention (Relative Value) |
|---|---|---|---|---|---|---|---|---|
| Example 1-11 | $LiNi_{0.8}Co_{0.2}O_2$ | MgO | 88 | $LiNi_{0.8}Co_{0.2}O_2$ | MgO | 3 | 29.3 | 122 |
| Example 1-12 | $LiNi_{0.8}Co_{0.2}O_2$ | CaO | 33 | $LiNi_{0.8}Co_{0.2}O_2$ | CaO | 4 | 8.25 | 114 |
| Example 1-13 | $LiNi_{0.8}Co_{0.2}O_2$ | $AlPO_4$ | 36 | $LiNi_{0.8}Co_{0.2}O_2$ | $AlPO_4$ | 3 | 12 | 116 |
| Example 1-14 | $LiNi_{0.8}Co_{0.2}O_2$ | $Fe_3O_4$ | 51 | $LiNi_{0.8}Co_{0.2}O_2$ | $Fe_3O_4$ | 5 | 10.2 | 116 |
| Example 1-15 | $LiNi_{0.8}Co_{0.2}O_2$ | CuO | 43 | $LiNi_{0.8}Co_{0.2}O_2$ | CuO | 2 | 21.5 | 122 |
| Example 1-16 | $LiNi_{0.8}Co_{0.2}O_2$ | ZnO | 76 | $LiNi_{0.8}Co_{0.2}O_2$ | ZnO | 2 | 38 | 120 |
| Example 1-17 | $LiNi_{0.8}Co_{0.2}O_2$ | $ZrO_2$ | 62 | $LiNi_{0.8}Co_{0.2}O_2$ | $ZrO_2$ | 5 | 12.4 | 117 |
| Example 1-18 | $LiNi_{0.8}Co_{0.2}O_2$ | $Nb_2O_5$ | 50 | $LiNi_{0.8}Co_{0.2}O_2$ | $Nb_2O_5$ | 3 | 16.7 | 121 |
| Example 1-19 | $LiNi_{0.8}Co_{0.2}O_2$ | $MoO_3$ | 33 | $LiNi_{0.8}Co_{0.2}O_2$ | $MoO_3$ | 2 | 16.5 | 120 |
| Example 1-20 | $LiNi_{0.8}Co_{0.2}O_2$ | $Ta_2O_5$ | 35 | $LiNi_{0.8}Co_{0.2}O_2$ | $Ta_2O_5$ | 3 | 11.7 | 116 |
| Example 1-21 | $LiNi_{0.8}Co_{0.2}O_2$ | $WO_3$ | 43 | $LiNi_{0.8}Co_{0.2}O_2$ | $WO_3$ | 4 | 10.75 | 116 |
| Example 1-22 | $LiNi_{0.8}Co_{0.2}O_2$ | $SiO_2$ | 39 | $LiNi_{0.8}Co_{0.2}O_2$ | $SiO_2$ | 4 | 9.75 | 114 |
| Example 1-23 | $LiNi_{0.8}Co_{0.2}O_2$ | $Li_2O$—$2B_2O_3$ | 30 | $LiNi_{0.8}Co_{0.2}O_2$ | $Li_xB_yO$ | 4 | 7.5 | 113 |

TABLE 6

*Negative Electrode Active Material: Graphite

| | Positive Electrode Active Material Particles 120 of First Portion 12$_1$ of Positive Electrode Mixture Layer 32 | First Oxide Layer 121 | Thickness t$_1$ (nm) of First Oxide Layer 121 | Positive Electrode Active Material Particles 120 of Second Portion 12$_2$ of Positive Electrode Mixture Layer 32 | Second Oxide Layer 122 | Thickness t$_2$ (nm) of Second Oxide Layer 122 | Ratio r (=t$_1$/t$_2$) of Thicknesses of Oxide Layers | Capacity Retention (Relative Value) |
|---|---|---|---|---|---|---|---|---|
| Comparative Example 1-1 | LiNi$_{0.8}$Co$_{0.2}$O$_2$ | — | — | LiNi$_{0.8}$Co$_{0.2}$O$_2$ | — | — | — | 100 |
| Comparative Example 1-2 | LiNi$_{0.8}$Co$_{0.2}$O$_2$ | — | — | LiNi$_{0.8}$Co$_{0.2}$O$_2$ | NiO | 20 | — | 96 |
| Comparative Example 1-3 | LiNi$_{0.8}$Co$_{0.2}$O$_2$ | NiO | 200 | LiNi$_{0.8}$Co$_{0.2}$O$_2$ | NiO | 20 | 10 | 83 |
| Comparative Example 1-4 | LiNi$_{0.8}$Co$_{0.2}$O$_2$ | NiO | 120 | LiNi$_{0.8}$Co$_{0.2}$O$_2$ | NiO | 0.5 | 240 | 83 |
| Comparative Example 1-5 | LiNi$_{0.8}$Co$_{0.2}$O$_2$ | NiO | 2 | LiNi$_{0.8}$Co$_{0.2}$O$_2$ | NiO | 50 | 0.04 | 71 |

The results of Tables 4 to 6 show that each of the nonaqueous electrolyte batteries 100 of Example 1-1 to Example 1-23 has a more excellent capacity retention than that of each of the nonaqueous electrolyte batteries of Comparative Example 1-1 to Comparative Example 1-5. The results of Tables 4 to 6 show that the same effects are obtained in Example 1 series even if the compositions of the first and second oxide layers are different.

On the other hand, although the nonaqueous electrolyte batteries of Comparative Example 1-3 and Comparative Example 1-4 included the first oxide layer and the second oxide layer, each of the nonaqueous electrolyte batteries had a poorer capacity retention than that of each of the nonaqueous electrolyte batteries 100 of Example 1-1 to Example 1-23, and had a poorer capacity retention than that of each of the nonaqueous electrolyte batteries of Comparative Example 1-1 and Comparative Example 1-2. This is considered to be because the thickness of the first oxide layer was as large as 200 nm, and the resistance of the first oxide layer was large, which advances excessive deterioration in the second portion of the positive electrode mixture layer.

The nonaqueous electrolyte battery of Comparative Example 1-5 included the first oxide layer and the second oxide layer. However, the nonaqueous electrolyte battery had a poorer capacity retention than that of each of the nonaqueous electrolyte batteries 100 of Example 1-1 to Example 1-23, and had a poorer capacity retention than that of each of the nonaqueous electrolyte batteries of Comparative Example 1-1 to Comparative Example 1-4. This is considered to be because the thickness of the second oxide layer is more than the thickness of the first oxide layer, and the shift of the advance of the deterioration in the positive electrode active material between the first portion and second portion of the positive electrode mixture layer cannot be suppressed.

Example 2-1 to Example 2-4

In Example 2-1 to Example 2-4, nonaqueous electrolyte batteries 100 of Example 2-1 to Example 2-4 were produced in the same manner as in Example 1-1 except that positive electrode active material particles were changed to that shown in the following Table 7; that the preparation conditions of a mixed solution for preparing a first slurry so that a target first oxide layer 121 shown in the following Table 7 and having a thickness t$_1$ was obtained were changed as described above; and that the preparation conditions of a mixed solution for preparing a second slurry so that a target second oxide layer 122 shown in the following Table 7 and having a thickness t$_2$ was obtained were changed as described above.

Comparative Example 2-1 to Comparative Example 2-4

In Comparative Example 2-1 to Comparative Example 2-4, nonaqueous electrolyte batteries of Comparative Example 2-1 to Comparative Example 2-4 were produced in the same manner as in each of Example 2-1 to Example 2-4 except that a positive electrode active material particle powder subjected to no oxide layer forming processing was used in place of a positive electrode active material composite powder when a first slurry and a second slurry for producing a positive electrode were produced. That is, the nonaqueous electrolyte batteries of Comparative Examples 2-1 to 2-4 contained neither a first oxide layer nor a second oxide layer.

<Evaluation>

In Example 2-1 to Example 2-4, the first oxide layer and the second oxide layer were identified in the same manner as in Example 1-1 when the first slurry and the second slurry were prepared. The results are shown in the following Table 7.

In Example 2-1 to Example 2-4 and Comparative Example 2-1 to Comparative Example 2-4, the thickness T of the positive electrode mixture layer 32, the thickness T$_1$ of the first portion 12$_1$ of the positive electrode mixture layer 32, and the thickness T$_2$ of the second portion 12$_2$ of the positive electrode mixture layer 32 were measured in the same manner as in Example 1-1. As a result, the thickness T of the positive electrode mixture layer 32, the thickness T$_1$ of the first portion 12$_1$ of the positive electrode mixture layer 32, and the thickness T$_2$ of the second portion 12$_2$ of the positive electrode mixture layer 32 were the same as those of Example 1-1.

The nonaqueous electrolyte batteries 100 of Example 2-1 to Example 2-4 and the nonaqueous electrolyte batteries of Comparative Example 2-1 to Comparative Example 2-4 were measured for the capacity retention and the thicknesses of the first oxide layer and second oxide layer, using the same procedure as that in the nonaqueous electrolyte battery 100 of Example 1-1. The results are shown in the following Table 7. In Table 7, the capacity retention of each of the nonaqueous electrolyte batteries 100 of Example 2-1 to Example 2-4 is shown as a relative value when the capacity retention of each of the nonaqueous electrolyte batteries of Comparative Example 2-1 to Comparative Example 2-4 is defined as 100.

85% by weight of a lithium titanate ($Li_4Ti_5O_{12}$) powder having a lithium insertion potential of 1.55 V (vs. $Li/Li^+$) and having a spinel type structure as a negative electrode active material, 5% by weight of graphite, 3% by weight of acetylene black, and 7% by weight of PVdF were added to NMP, followed by mixing, to prepare a slurry. The slurry was applied to each of both surfaces of a negative electrode current collector 21 made of an 11-μm-thick aluminum foil, dried, and pressed. When the application, a portion to which the slurry was not applied was left on the negative electrode current collector 21. Thus, a negative electrode 2 was produced, which included the negative electrode current collector 21 and a negative electrode mixture layer 22

TABLE 7

| | *Negative Electrode Active Material: Graphite | | | | | | | |
|---|---|---|---|---|---|---|---|---|
| | Positive Electrode Active Material Particles 120 of First Portion $12_1$ of Positive Electrode Mixture Layer 32 | First Oxide Layer 121 | Thickness $t_1$ (nm) of First Oxide Layer 121 | Positive Electrode Active Material Particles 120 of Second Portion $12_2$ of Positive Electrode Mixture Layer 32 | Second Oxide Layer 122 | Thickness $t_2$ (nm) of Second Oxide Layer 122 | Ratio r (=$t_1/t_2$) of Thicknesses of Oxide Layers | Capacity Retention (Relative Value) |
| Example 2-1 | $LiCoO_2$ | CoO | 25 | $LiCoO_2$ | CoO | 3 | 8.3 | 115 |
| Example 2-2 | $LiMn_2O_4$ | $Al_2O_3$ | 25 | $LiMn_2O_4$ | $Al_2O_3$ | 3 | 8.3 | 113 |
| Example 2-3 | $LiNi_{0.8}Co_{0.2}O_2$ | $Al_2O_3$ | 25 | $LiCoO_2$ | $Al_2O_3$ | 3 | 8.3 | 115 |
| Example 2-4 | $LiFePO_4$ | $Li_4P_2O_7$ | 25 | $LiFePO_4$ | $Li_4P_2O_7$ | 3 | 8.3 | 114 |
| Comparative Example 2-1 | $LiCoO_2$ | — | — | $LiCoO_2$ | — | — | — | 100 |
| Comparative Example 2-2 | $LiMn_2O_4$ | — | — | $LiMn_2O_4$ | — | — | — | 100 |
| Comparative Example 2-3 | $LiFePO_4$ | — | — | $LiFePO_4$ | — | — | — | 100 |
| Comparative Example 2-4 | $LiNi_{0.8}Co_{0.2}O_2$ | — | — | $LiCoO_2$ | — | — | — | 100 |

The results of Table 7 show that each of the nonaqueous electrolyte batteries 100 of Example 2-1 to Example 2-4 has a more excellent capacity retention than that of each of the nonaqueous electrolyte batteries of Comparative Example 2-1 to Comparative Example 2-4. The results of Table 7 show that although the positive electrode active material particles in the nonaqueous electrolyte batteries 100 of Example 2 series are different from those in the nonaqueous electrolyte batteries 100 of Example 1 series, the nonaqueous electrolyte batteries 100 of Example 2 series can exhibit the same effects as those of the nonaqueous electrolyte batteries 100 of Example 1 series.

Example 3-1 to Examples 3-23 and Comparative Example 3-1 to Comparative Example 3-5

In Example 3-1 to Examples 3-23 and Comparative Example 3-1 to Comparative Example 3-5, nonaqueous electrolyte batteries were produced in the same manner as in Example 1-1 to Example 1-23 and Comparative Example 1-1 to Comparative Example 1-5 except that a lithium titanate ($Li_4Ti_5O_{12}$) powder having a lithium insertion potential of 1.55 V (vs. $Li/Li^+$) and having a spinel type structure was used as a negative electrode active material in place of a graphite powder.

Specifically, in Example 3-1 to Examples 3-23 and Comparative Example 3-1 to Comparative Example 3-5, a negative electrode 2 was produced in the following procedure.

supported on each of both surfaces of the negative electrode current collector 21 and having a density of 2.0 $g/cm^3$.

<Evaluation>

In Example 3-1 to Example 3-23 and Comparative Example 3-1 to Comparative Example 3-5, the thickness T of the positive electrode mixture layer 32, the thickness $T_1$ of the first portion $12_1$ of the positive electrode mixture layer 32, and the thickness $T_2$ of the second portion $12_2$ of the positive electrode mixture layer 32 were measured in the same manner as in Example 1-1. As a result, the thickness T of the positive electrode mixture layer 32, the thickness $T_1$ of the first portion $12_1$ of the positive electrode mixture layer 32, and the thickness $T_2$ of the second portion $12_2$ of the positive electrode mixture layer 32 in these Examples were the same as those of Example 1-1.

The nonaqueous electrolyte batteries 100 of Example 3-1 to Examples 3-23 and the nonaqueous electrolyte batteries of Comparative Example 3-1 to Comparative Example 3-5 were measured for the capacity retention and the thicknesses of the first oxide layer and second oxide layer, using the same procedure as that in the nonaqueous electrolyte battery 100 of Example 1-1. The results are shown in the following Tables 8 to 10. In Tables 8 to 10, the capacity retention of each of the nonaqueous electrolyte batteries is shown as a relative value when the capacity retention of the nonaqueous electrolyte battery of Comparative Example 3-1 is defined as 100.

TABLE 8

*Negative Electrode Active Material: Lithium Titanate having Spinel Structure

| | Positive Electrode Active Material Particles 120 of First Portion $12_1$ of Positive Electrode Mixture Layer 32 | First Oxide Layer 121 | Thickness $t_1$ (nm) of First Oxide Layer 121 | Positive Electrode Active Material Particles 120 of Second Portion $12_2$ of Positive Electrode Mixture Layer 32 | Second Oxide Layer 122 | Thickness $t_2$ (nm) of Second Oxide Layer 122 | Ratio r (=$t_1/t_2$) of Thicknesses of Oxide Layers | Capacity Retention (Relative Value) |
|---|---|---|---|---|---|---|---|---|
| Example 3-1 | $LiNi_{0.8}Co_{0.2}O_2$ | NiO | 20 | $LiNi_{0.8}Co_{0.2}O_2$ | NiO | 10 | 2 | 112 |
| Example 3-2 | $LiNi_{0.8}Co_{0.2}O_2$ | NiO | 2 | $LiNi_{0.8}Co_{0.2}O_2$ | NiO | 1 | 2 | 102 |
| Example 3-3 | $LiNi_{0.8}Co_{0.2}O_2$ | NiO | 80 | $LiNi_{0.8}Co_{0.2}O_2$ | NiO | 15 | 5.3 | 116 |
| Example 3-4 | $LiNi_{0.8}Co_{0.2}O_2$ | NiO | 20 | $LiNi_{0.8}Co_{0.2}O_2$ | NiO | 1 | 20 | 137 |
| Example 3-5 | $LiNi_{0.8}Co_{0.2}O_2$ | NiO | 100 | $LiNi_{0.8}Co_{0.2}O_2$ | NiO | 2 | 50 | 125 |
| Example 3-6 | $LiNi_{0.8}Co_{0.2}O_2$ | NiO | 100 | $LiNi_{0.8}Co_{0.2}O_2$ | NiO | 0.5 | 200 | 105 |
| Example 3-7 | $LiNi_{0.8}Co_{0.2}O_2$ | CoO | 5 | $LiNi_{0.8}Co_{0.2}O_2$ | CoO | 2 | 2.5 | 105 |
| Example 3-8 | $LiNi_{0.8}Co_{0.2}O_2$ | CoO | 50 | $LiNi_{0.8}Co_{0.2}O_2$ | CoO | 10 | 5 | 119 |
| Example 3-9 | $LiNi_{0.8}Co_{0.2}O_2$ | MnO | 10 | $LiNi_{0.8}Co_{0.2}O_2$ | MnO | 4 | 2.5 | 107 |
| Example 3-10 | $LiNi_{0.8}Co_{0.2}O_2$ | MnO | 60 | $LiNi_{0.8}Co_{0.2}O_2$ | MnO | 15 | 4 | 116 |

TABLE 9

*Negative Electrode Active Material: Lithium Titanate having Spinel Structure

| | Positive Electrode Active Material Particles 120 of First Portion $12_1$ of Positive Electrode Mixture Layer 32 | First Oxide Layer 121 | Thickness $t_1$ (nm) of First Oxide Layer 121 | Positive Electrode Active Material Particles 120 of Second Portion $12_2$ of Positive Electrode Mixture Layer 32 | Second Oxide Layer 122 | Thickness $t_2$ (nm) of Second Oxide Layer 122 | Ratio r (=$t_1/t_2$) of Thicknesses of Oxide Layers | Capacity Retention (Relative Value) |
|---|---|---|---|---|---|---|---|---|
| Example 3-11 | $LiNi_{0.8}Co_{0.2}O_2$ | MgO | 88 | $LiNi_{0.8}Co_{0.2}O_2$ | MgO | 3 | 29.3 | 137 |
| Example 3-12 | $LiNi_{0.8}Co_{0.2}O_2$ | CaO | 33 | $LiNi_{0.8}Co_{0.2}O_2$ | CaO | 4 | 8.25 | 123 |
| Example 3-13 | $LiNi_{0.8}Co_{0.2}O_2$ | $AlPO_4$ | 36 | $LiNi_{0.8}Co_{0.2}O_2$ | $AlPO_4$ | 3 | 12 | 127 |
| Example 3-14 | $LiNi_{0.8}Co_{0.2}O_2$ | $Fe_3O_4$ | 51 | $LiNi_{0.8}Co_{0.2}O_2$ | $Fe_3O_4$ | 5 | 10.2 | 126 |
| Example 3-15 | $LiNi_{0.8}Co_{0.2}O_2$ | CuO | 43 | $LiNi_{0.8}Co_{0.2}O_2$ | CuO | 2 | 21.5 | 137 |
| Example 3-16 | $LiNi_{0.8}Co_{0.2}O_2$ | ZnO | 76 | $LiNi_{0.8}Co_{0.2}O_2$ | ZnO | 2 | 38 | 133 |
| Example 3-17 | $LiNi_{0.8}Co_{0.2}O_2$ | $ZrO_2$ | 62 | $LiNi_{0.8}Co_{0.2}O_2$ | $ZrO_2$ | 5 | 12.4 | 129 |
| Example 3-18 | $LiNi_{0.8}Co_{0.2}O_2$ | $Nb_2O_5$ | 50 | $LiNi_{0.8}Co_{0.2}O_2$ | $Nb_2O_5$ | 3 | 16.7 | 135 |
| Example 3-19 | $LiNi_{0.8}Co_{0.2}O_2$ | $MoO_3$ | 33 | $LiNi_{0.8}Co_{0.2}O_2$ | $MoO_3$ | 2 | 16.5 | 134 |
| Example 3-20 | $LiNi_{0.8}Co_{0.2}O_2$ | $Ta_2O_5$ | 35 | $LiNi_{0.8}Co_{0.2}O_2$ | $Ta_2O_5$ | 3 | 11.7 | 127 |
| Example 3-21 | $LiNi_{0.8}Co_{0.2}O_2$ | $WO_3$ | 43 | $LiNi_{0.8}Co_{0.2}O_2$ | $WO_3$ | 4 | 10.75 | 126 |
| Example 3-22 | $LiNi_{0.8}Co_{0.2}O_2$ | $SiO_2$ | 39 | $LiNi_{0.8}Co_{0.2}O_2$ | $SiO_2$ | 4 | 9.75 | 124 |
| Example 3-23 | $LiNi_{0.8}Co_{0.2}O_2$ | $Li_2O$—$2B_2O_3$ | 30 | $LiNi_{0.8}Co_{0.2}O_2$ | $Li_xB_yO$ | 4 | 7.5 | 121 |

TABLE 10

*Negative Electrode Active Material: Lithium Titanate having Spinel Structure

| | Positive Electrode Active Material Particles 120 of First Portion $12_1$ of Positive Electrode Mixture Layer 32 | First Oxide Layer 121 | Thickness $t_1$ (nm) of First Oxide Layer 121 | Positive Electrode Active Material Particles 120 of Second Portion $12_2$ of Positive Electrode Mixture Layer 32 | Second Oxide Layer 122 | Thickness $t_2$ (nm) of Second Oxide Layer 122 | Ratio r (=$t_1/t_2$) of Thicknesses of Oxide Layers | Capacity Retention (Relative Value) |
|---|---|---|---|---|---|---|---|---|
| Comparative Example 3-1 | $LiNi_{0.8}Co_{0.2}O_2$ | — | — | $LiNi_{0.8}Co_{0.2}O_2$ | — | — | — | 100 |
| Comparative Example 3-2 | $LiNi_{0.8}Co_{0.2}O_2$ | — | — | $LiNi_{0.8}Co_{0.2}O_2$ | NiO | 20 | — | 97 |
| Comparative Example 3-3 | $LiNi_{0.8}Co_{0.2}O_2$ | NiO | 200 | $LiNi_{0.8}Co_{0.2}O_2$ | NiO | 20 | 10 | 88 |
| Comparative Example 3-4 | $LiNi_{0.8}Co_{0.2}O_2$ | NiO | 120 | $LiNi_{0.8}Co_{0.2}O_2$ | NiO | 0.5 | 240 | 88 |
| Comparative Example 3-5 | $LiNi_{0.8}Co_{0.2}O_2$ | NiO | 2 | $LiNi_{0.8}Co_{0.2}O_2$ | NiO | 50 | 0.04 | 79 |

The results of Tables 8 to 10 show that each of the nonaqueous electrolyte batteries 100 of Example 3-1 to Example 3-23 has a more excellent capacity retention than that of each of the nonaqueous electrolyte batteries of Comparative Example 3-1 to Comparative Example 3-5. The results of Tables 8 to 10 show that Example 3 series can exhibit the same effects even if the compositions of the first and second oxide layers are different.

In comparison of the results of Example 1 series shown in Tables 4 to 6 with the results of Example 3 series shown in Table 8 to 10, it is found that each of the nonaqueous electrolyte batteries 100 of Example 3 series using lithium titanate having a spinel type structure as the negative electrode active material can achieve a more excellent capacity retention than that of each of the nonaqueous electrolyte batteries 100 of Example 1 series using graphite as the negative electrode active material.

Example 4-1 to Example 4-4 and Comparative Example 4-1 to Comparative Example 4-4

In Example 4-1 to Example 4-4 and Comparative Example 4-1 to Comparative Example 4-4, nonaqueous electrolyte batteries of Example 4-1 to Example 4-4 and Comparative Example 4-1 to Comparative Example 4-4 were produced in the same manner as in Example 2-1 to Example 2-4 and Comparative Example 2-1 to Comparative Example 2-4 except that a lithium titanate ($Li_4Ti_5O_{12}$) powder having a lithium insertion potential of 1.55 V (vs. Li/Li$^+$) and having a spinel type structure was used as a negative electrode active material in place of a graphite powder.

The negative electrode 2 containing lithium titanate having a spinel type structure as the negative electrode active material was produced using the same procedure as that in Example 3 series.

<Evaluation>

In Example 4-1 to Example 4-4 and Comparative Example 4-1 to Comparative Example 4-4, the thickness T of the positive electrode mixture layer 32, the thickness $T_1$ of the first portion $12_1$ of the positive electrode mixture layer 32, and the thickness $T_2$ of the second portion $12_2$ of the positive electrode mixture layer 32 were measured in the same manner as in Example 1-1. As a result, the thickness T of the positive electrode mixture layer 32, the thickness $T_1$ of the first portion $12_1$ of the positive electrode mixture layer 32, and the thickness $T_2$ of the second portion $12_2$ of the positive electrode mixture layer 32 in these Examples were the same as those of Example 1-1.

The nonaqueous electrolyte batteries of Example 4-1 to Examples 4-4 and the nonaqueous electrolyte batteries of Comparative Example 4-1 to Comparative Example 4-4 were measured for the capacity retention and the thicknesses of the first oxide layer and second oxide layer in the same manner as in the nonaqueous electrolyte battery of Example 1-1. The results are shown in the following Table 11. In Table 11, the capacity retention of each of the nonaqueous electrolyte batteries 100 of Example 4-1 to Example 4-4 is shown as a relative value respectively when the capacity retention of each of the nonaqueous electrolyte batteries 100 of Comparative Example 4-1 to Comparative Example 4-4 is defined as 100.

TABLE 11

*Negative Electrode Active Material: Lithium Titanate having Spinel Structure

| | Positive Electrode Active Material Particles 120 of First Portion $12_1$ of Positive Electrode Mixture Layer 32 | First Oxide Layer 121 | Thickness $t_1$ (nm) of First Oxide Layer 121 | Positive Electrode Active Material Particles 120 of Second Portion $12_2$ of Positive Electrode Mixture Layer 32 | Second Oxide Layer 122 | Thickness $t_2$ (nm) of Second Oxide Layer 122 | Ratio r (=$t_1/t_2$) of Thicknesses of Oxide Layers | Capacity Retention (Relative Value) |
|---|---|---|---|---|---|---|---|---|
| Example 4-1 | $LiCoO_2$ | CoO | 25 | $LiCoO_2$ | CoO | 3 | 8.3 | 125 |
| Example 4-2 | $LiMn_2O_4$ | $Al_2O_3$ | 25 | $LiMn_2O_4$ | $Al_2O_3$ | 3 | 8.3 | 122 |
| Example 4-3 | $LiNi_{0.8}Co_{0.2}O_2$ | $Al_2O_3$ | 25 | $LiCoO_2$ | $Al_2O_3$ | 3 | 8.3 | 125 |

TABLE 11-continued

*Negative Electrode Active Material: Lithium Titanate having Spinel Structure

| | Positive Electrode Active Material Particles 120 of First Portion $12_1$ of Positive Electrode Mixture Layer 32 | First Oxide Layer 121 | Thickness $t_1$ (nm) of First Oxide Layer 121 | Positive Electrode Active Material Particles 120 of Second Portion $12_2$ of Positive Electrode Mixture Layer 32 | Second Oxide Layer 122 | Thickness $t_2$ (nm) of Second Oxide Layer 122 | Ratio r (=$t_1/t_2$) of Thicknesses of Oxide Layers | Capacity Retention (Relative Value) |
|---|---|---|---|---|---|---|---|---|
| Example 4-4 | LiFePO$_4$ | Li$_4$P$_2$O$_7$ | 25 | LiFePO$_4$ | Li$_4$P$_2$O$_7$ | 3 | 8.3 | 123 |
| Comparative Example 4-1 | LiCoO$_2$ | — | — | LiCoO$_2$ | — | — | — | 100 |
| Comparative Example 4-2 | LiMn$_2$O$_4$ | — | — | LiMn$_2$O$_4$ | — | — | — | 100 |
| Comparative Example 4-3 | LiFePO$_4$ | — | — | LiFePO$_4$ | — | — | — | 100 |
| Comparative Example 4-4 | LiNi$_{0.8}$Co$_{0.2}$O$_2$ | — | — | LiCoO$_2$ | — | — | — | 100 |

The results of Table 11 show that each of the nonaqueous electrolyte batteries 100 of Example 4-1 to Example 4-4 has a more excellent capacity retention than that of each of the nonaqueous electrolyte batteries of Comparative Example 4-1 to Comparative Example 4-4. The results of Table 11 show that although the positive electrode active material particles in the nonaqueous electrolyte batteries 100 of Example 4 series are different from those in the nonaqueous electrolyte batteries 100 of Example 3 series, the nonaqueous electrolyte batteries 100 of Example 4 series can exhibit the same effects as those of the nonaqueous electrolyte batteries 100 of Example 3 series.

In comparison the results of Example 2 series shown in Table 7 with the results of Example 4 series shown in Table 11, it is found that each of the nonaqueous electrolyte batteries 100 of Example 4 series using lithium titanate having a spinel type structure as the negative electrode active material can achieve a more excellent capacity retention than that of each of the nonaqueous electrolyte batteries 100 of Example 2 series using graphite as the negative electrode active material.

Furthermore, although the nonaqueous electrolyte batteries of Example 1-1 to 1-23, Example 2-1 to 2-4, Example 3-1 to Example 3-23, and Example 4-1 to 4-4 had the positive electrode having a high density, the nonaqueous electrolyte batteries could exhibit an excellent capacity retention as described above.

That is, at least one embodiment and Example described above provide the electrode in which the thickness of the first oxide layer formed on the surfaces of the active material particles contained in the first portion of the electrode mixture layer is more than the thickness of the second oxide layer formed on the surfaces of the active material particles contained in the second portion of the electrode mixture layer. The electrode can eliminate the deviation of the deterioration in the active material in the electrode mixture layer while suppressing the decrease in the capacity of the electrode, and therefore, the electrode can achieve a nonaqueous electrolyte battery capable of exhibiting a high energy density and an excellent capacity retention.

While certain embodiments of the present invention have been described, these embodiments have been presented by way of example only, and are not intended to limit the scope of the invention. The novel embodiments may be embodied in a variety of other forms, and various omissions, substitutions and changes may be made without departing from the spirit of the invention. The accompanying claims and their equivalents are intended to cover such forms or modifications as would fall within the scope and spirit of the invention.

What is claimed is:

1. An electrode comprising:
   an electrode mixture layer comprising active material particles comprising Li and at least one transition metal selected from the group consisting of Fe, Mn, Co and Ni; and
   a current collector comprising at least one surface on which the electrode mixture layer is supported,
   wherein:
   the electrode mixture layer comprises a first surface being in contact with the current collector and a second surface separated by a thickness of the electrode mixture layer from the first surface;
   the electrode mixture layer comprises:
   a first portion having a thickness of at least 20% of the thickness of the electrode mixture layer and comprising the first surface; and
   a second portion having a thickness of at least 20% of the thickness of the electrode mixture layer and comprising the second surface;
   in the first portion of the electrode mixture layer, a first oxide layer is formed on surfaces of the active material particles, the first oxide layer comprising at least one element selected from the group consisting of Li, Mg, Ca, B, Al, Si, P, Fe, Mn, Co Ni, Cu, Zn, Zr, Nb, Mo, Ta, and W, and having a thickness of more than 0.5 nm and 100 nm or less;
   in the second portion of the electrode mixture layer, a second oxide layer is formed on surfaces of the active material particles, the second oxide layer comprising at least one element selected from the group consisting of Li, Mg, Ca, B, Al, Si, P, Fe, Mn, Co, Ni, Cu, Zn, Zr, Nb, Mo, Ta, and W, and having a thickness of 0.5 nm or more and less than 100 nm; and
   the thickness of the first oxide layer is more than the thickness of the second oxide layer.

2. The electrode according to claim 1, wherein a ratio of the thickness of the first oxide layer to the thickness of the second oxide layer is 5 or more.

3. The electrode according to claim 1, wherein a ratio of the thickness of the first oxide layer to the thickness of the second oxide layer is 200 or less.

4. The electrode according to claim 1, wherein a ratio of the thickness of the first oxide layer to the thickness of the second oxide layer is 5 or more and 50 or less.

5. The electrode according to claim 1, wherein the active material particles comprises at least one selected from the group consisting of a lithium-manganese composite oxide, a lithium-nickel composite oxide, a lithium-cobalt composite oxide, a lithium-nickel-cobalt composite oxide, a lithium-manganese-cobalt composite oxide, lithium-iron phosphate and a lithium composite phosphate compound.

6. The electrode according to claim 1, wherein the first oxide layer comprises at least one selected from the group consisting of NiO, CoO, MnO, MgO, CaO, $AlPO_4$, $Fe_3O_4$, CuO, ZnO, $Li_4P_2O_7$, $ZrO_2$, $Nb_2O_5$, $MoO_3$, $Ta_2O_5$, $WO_3$, $SiO_2$, $Al_2O_3$, and $Li_2O$-$2B_2O_3$.

7. The electrode according to claim 1, wherein the second oxide layer comprises at least one selected from the group consisting of NiO, CoO, MnO, MgO, CaO, $AlPO_4$, $Fe_3O_4$, CuO, ZnO, $Li_4P_2O_7$, $ZrO_2$, $Nb_2O_5$, $MoO_3$, $Ta_2O_5$, $WO_3$, $SiO_2$, $Al_2O_3$, and $Li_2O$-$2B_2O_3$.

8. The electrode according to claim 1, wherein
the first oxide layer comprises a first compound comprising the at least one element selected from the group consisting of Li, Mg, Ca, B, Al, Si, P, Fe, Mn, Co, Ni, Cu, Zn, Zr, Nb, Mo, Ta, and W;
the second oxide layer comprises a second compound comprising the at least one element selected from the group consisting of Li, Mg, Ca, B, Al, Si, P, Fe, Mn, Co, Ni, Cu, Zn, Zr, Nb, Mo, Ta, and W; and
the first compound is identical to the second compound.

9. A nonaqueous electrolyte battery comprising:
the electrode according to claim 1 as a positive electrode;
a negative electrode; and
a nonaqueous electrolyte.

10. The nonaqueous electrolyte battery according to claim 9, wherein the negative electrode comprises a negative electrode active material of which a lithium insertion-and-extraction potential is higher than a redox potential of lithium by a value of 1 V or more.

11. The nonaqueous electrolyte battery according to claim 10, wherein the negative electrode active material comprises lithium titanate having a spinel structure.

* * * * *